(12) United States Patent
D'Andola et al.

(10) Patent No.: US 11,999,865 B2
(45) Date of Patent: Jun. 4, 2024

(54) UV CURABLE COMPOSITION FOR USE IN 3D PRINTING

(71) Applicant: BASF SE, Ludwigshafen am Rhein (DE)

(72) Inventors: Giovanni D'Andola, Ludwigshafen am Rhein (DE); Andre Fuchs, Basel (CH); Edouard Loisel, Ludwigshafen am Rhein (DE); Dagmar Pascale Kunsmann-Keitel, Ludwigshafen am Rhein (DE); Erhard Guenther, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 600 days.

(21) Appl. No.: 17/279,369

(22) PCT Filed: Sep. 20, 2019

(86) PCT No.: PCT/EP2019/075277
§ 371 (c)(1),
(2) Date: Mar. 24, 2021

(87) PCT Pub. No.: WO2020/064523
PCT Pub. Date: Apr. 2, 2020

(65) Prior Publication Data
US 2021/0395558 A1  Dec. 23, 2021

(30) Foreign Application Priority Data
Sep. 24, 2018  (EP) ..................................... 18196332

(51) Int. Cl.
| | |
|---|---|
| C08F 2/46 | (2006.01) |
| B29C 64/124 | (2017.01) |
| B33Y 10/00 | (2015.01) |
| B33Y 70/00 | (2020.01) |
| B33Y 80/00 | (2015.01) |
| C08F 2/50 | (2006.01) |
| C08G 61/04 | (2006.01) |
| C09D 139/04 | (2006.01) |

(52) U.S. Cl.
CPC .......... *C09D 139/04* (2013.01); *B29C 64/124* (2017.08); *B33Y 10/00* (2014.12); *B33Y 70/00* (2014.12); *B33Y 80/00* (2014.12); *B29K 2039/00* (2013.01); *B29K 2995/0077* (2013.01); *B29K 2995/0089* (2013.01)

(58) Field of Classification Search
CPC .. C09D 11/101; C09D 11/102; C09D 139/04; B33Y 70/00; B33Y 80/00; B33Y 10/00; B29C 64/124; B29K 2039/00; B29K 2995/0077; B29K 2995/0089
USPC ................ 522/64, 6, 189, 184, 71, 1; 520/1
See application file for complete search history.

(56) References Cited

U.S. PATENT DOCUMENTS

| | | | |
|---|---|---|---|
| 3,862,333 A | 1/1975 | Chalupa et al. | |
| 4,151,175 A | 4/1979 | Crivello et al. | |
| 4,399,071 A | 8/1983 | Crivello et al. | |
| 4,575,330 A | 3/1986 | Hull | |
| 4,639,472 A * | 1/1987 | Green | C09D 4/06 522/167 |
| 4,694,029 A | 9/1987 | Land | |
| 4,738,870 A | 4/1988 | Green et al. | |
| 4,929,403 A | 5/1990 | Audsley | |

(Continued)

FOREIGN PATENT DOCUMENTS

| | | |
|---|---|---|
| EP | 0092269 A1 | 10/1983 |
| EP | 0555069 A1 | 8/1993 |

(Continued)

OTHER PUBLICATIONS

European Search Report for EP Patent Application No. 18196332.3, dated Mar. 6, 2019, 3 pages.
International Preliminary Report on Patentability received for PCT Patent Application No. PCT/EP2019/075277, dated Apr. 1, 2021, 8 pages.
International Search Report and Written Opinion received for PCT Patent Application No. PCT/EP2019/075277, dated Nov. 27, 2019, 10 pages.

*Primary Examiner* — Jessica Whiteley
(74) *Attorney, Agent, or Firm* — Faegre Drinker Biddle & Reath LLP

(57) ABSTRACT

The present invention relates to photocurable compositions, comprising (A1) a N-vinyloxazolidinone of formula (I), wherein $R^1$, $R^2$, $R^3$ and $R^4$ are independently of each other a hydrogen atom or an organic group having not more than 10 carbon atoms, (A2) optionally one, or more second reactive diluents, (B) one, or more oligomers, and (C) a photoinitiator (C), wherein the amount of component (A1) is 5 to 70% by weight based on the amount of components (A1), (A2) and (B), wherein the viscosity of said photocurable composition is in the range 10 to 3000 mPa·s, preferably 10 to 1500 mPa·s at 30° C. The compositions, from which cured three-dimensional shaped articles having balanced mechanical properties combining stiffness with high toughness can be made, are particularly suitable for the production of three-dimensional articles by stereolithography and photopolymer jetting.

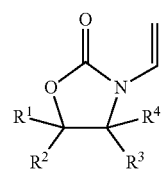

(I)

19 Claims, No Drawings

(56) References Cited

U.S. PATENT DOCUMENTS

| | | | |
|---|---|---|---|
| 4,950,581 A | 8/1990 | Koike et al. | |
| 6,306,555 B1 | 10/2001 | Schulz et al. | |
| 9,453,142 B2 | 9/2016 | Rolland et al. | |
| 2011/0319535 A1 | 12/2011 | Nesvadba et al. | |
| 2016/0016077 A1 | 1/2016 | Yokota et al. | |
| 2016/0122465 A1 | 5/2016 | Yin et al. | |
| 2016/0136889 A1 | 5/2016 | Rolland et al. | |
| 2016/0137838 A1 | 5/2016 | Rolland et al. | |
| 2016/0193852 A1* | 7/2016 | Guenther | C09D 11/101 347/102 |

FOREIGN PATENT DOCUMENTS

| | | |
|---|---|---|
| EP | 0562897 A1 | 9/1993 |
| JP | 57-109813 A | 7/1982 |
| JP | 2003-089711 A | 3/2003 |
| WO | 98/46647 A1 | 10/1998 |
| WO | 2008/012292 A1 | 1/2008 |
| WO | 2010/057839 A1 | 5/2010 |
| WO | 2014/191228 A1 | 12/2014 |
| WO | 2015/022228 A1 | 2/2015 |
| WO | 2018/106977 A1 | 6/2018 |
| WO | 2018/146259 A1 | 8/2018 |

* cited by examiner

UV CURABLE COMPOSITION FOR USE IN 3D PRINTING

CROSS-REFERENCE TO RELATED APPLICATIONS

This application is a national stage application (under 35 U.S.C. § 371) of PCT/EP2019/075277, filed Sep. 20, 2019, which claims benefit of European Application No. 18196332.3, filed Sep. 24, 2018, both of which are incorporated herein by reference in their entirety.

The present invention relates to photocurable compositions, comprising
(A1) a N-vinyloxazolidinone of formula

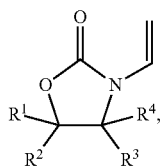

wherein
$R^1$, $R^2$, $R^3$ and $R^4$ are independently of each other a hydrogen atom or an organic group having not more than 10 carbon atoms,
(A2) optionally one, or more second reactive diluents,
(B) one, or more oligomers, and
(C) a photoinitiator (C), wherein the amount of component (A1) is 5 to 70% by weight based on the amount of components (A1), (A2) and (B), wherein the viscosity of said photocurable composition is in the range 10 to 3000 mPa·s, preferably 10 to 1500 mPa·s at 30° C. The compositions, from which cured three-dimensional shaped articles having balanced mechanical properties combining stiffness with high toughness can be made, are particularly suitable for the production of three-dimensional articles by stereolithography and photopolymer jetting.

JP57109813 discloses a curing composition that is composed of N-vinyl-2-oxazolidone and a crosslinkable monomer containing acryloyl or methacryloyl groups, thus suitably being used as a coating material for metal, because of its high curing rate and high adhesion.

EP-A-555 069 discloses that the performance characteristics of radiation curable compositions can be improved by adding solid monomers, in particular N-vinylcaprolactam. However, the handling of such solid monomers is disadvantageous. According to WO2010/057839 N-vinylcaprolactam may be replaced by a mixture of N-vinylcaprolactam with an N-vinylamide.

U.S. Pat. No. 4,639,472 discloses radiation curable compositions comprising N-vinyloxazolidinone. Printing inks are mentioned as one possible application of such radiation curable compositions.

U.S. Pat. No. 4,738,870 relates to a photopolymerizable composition comprising a (hydroxy)phosphinylalkyl compound of the formula HOP(=O)—CR'R"—O—C(=O)—C(R)=CH$_2$ wherein R is hydrogen, methyl or ethyl and R' and R" are selected independently from hydrogen and alkyl of 1-10 carbon atoms, in an amount sufficient to promote adhesion of the resulting photopolymerizable composition to a substrate; at least one copolymerizable ethylenically unsaturated monomer in an amount sufficient to provide the resulting photopolymerized composition with desired physical properties and a photoinitiator in an amount sufficient to initiate polymerization upon exposing the composition to light and a process for coating a substrate comprising applying to the substrate the composition of U.S. Pat. No. 4,738,870 and exposing the thus-coated substrate to actinic radiation for a time sufficient to photopolymerize the composition.

U.S. Pat. No. 4,929,403 relates to a process for rapidly forming a multilayer flexible mold for finely detailed objects from a radiatively curable molding composition, the process comprising: (a) coating at least a portion of the surface of a three-dimensional object with a fluid molding composition, the molding composition being radiatively curable; (b) curing the coating to form an elastic, flexible layer of cured molding composition on the three-dimensional object by exposing the fluid coating composition to radiative energy; (c) repeating steps (a) and (b) successively until a self-supporting multilayer elastic coating of cured molding composition has been formed on the three-dimensional object, the multilayer coating being sufficiently strong so as to not distort perceptibly when filled with a molding material having a low to moderate density; and (d) removing the three-dimensional object.

The fluid molding composition may comprise (a) at least one crosslinkable oligomer; (b) at least one reactive diluent; and (c) at least one photoinitiator.

WO2015022228 relates to the use of a radiation curable composition as printing ink for ink-jet printing, wherein the radiation curable composition comprises N-vinyloxazolidinone of formula

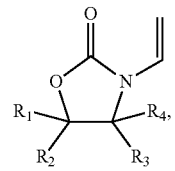

in which $R_1$ to $R_4$ independently from each other are a hydrogen atom or an organic radical having not more than 10 carbon atoms.

WO18146259 relates to compositions comprising a compound of formula (I)

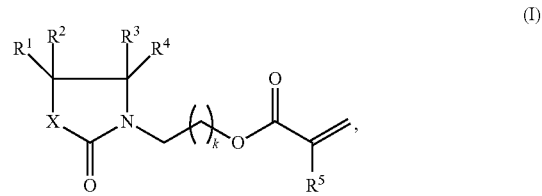

wherein
$R^1$, $R^2$, $R^3$, $R^4$ are each independently H, $C_1$-$C_6$-alkyl, $C_1$-$C_6$-alkoxy, or $C_1$-$C_6$-alkoxy-$C_1$-$C_6$-alkyl;
$R^5$ is H or $C_1$-$C_6$-alkyl;
X is $CR^6R^7$, O, or $NR^8$;
$R^6$, $R^7$ are each independently H, $C_1$-$C_6$-alkyl, $C_1$-$C_6$-alkoxy, or $C_1$-$C_6$-alkoxy-$C_1$-$C_6$-alkyl; $R^8$ is H, $C_1$-$C_6$-alkyl, or $C_1$-$C_6$-alkoxy-$C_1$-$C_6$-alkyl; k is 1, 2, 3, 4 or 5 and the use of the compositions as printing inks, in particular inkjet printing inks.

It is the object of the present invention to provide photocurable compositions for 3D printing, in particular in photopolymer jetting and stereolithography. The photocurable compositions should have a high reactivity in radiation curing and should allow a 3D printing process resulting in three-dimensional articles with improved characteristics, in particular balanced mechanical properties combining stiffness with high toughness.

It has surprisingly been found that N-vinyloxazolidinone of formula (I) provide a strong diluting effect for high viscous oligomers resulting in a higher amount of oligomers which in fact may have a positive impact on stiffness/toughness. Cured three-dimensional shaped articles having balanced mechanical properties combining stiffness with high toughness can be made from the photocurable compositions of the present invention, in particular by stereolithography and photopolymer jetting.

Accordingly, the present invention is directed to photocurable compositions, comprising
(A1) a N-vinyloxazolidinone of formula

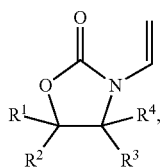

(I)

wherein
$R^1$, $R^2$, $R^3$ and $R^4$ are independently of each other a hydrogen atom or an organic group having not more than 10 carbon atoms,
(A2) optionally one, or more second reactive diluents,
(B) one, or more oligomers, and
(C) a photoinitiator (C), wherein the amount of component (A1) is 5 to 70% by weight based on the amount of components (A1), (A2) and (B).

The photocurable composition comprises preferably
(A1) a N-vinyloxazolidinone of formula

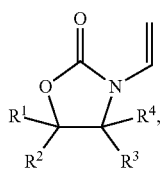

(I)

wherein
$R^1$, $R^2$, $R^3$ and $R^4$ are independently of each other a hydrogen atom or an organic group having not more than 10 carbon atoms,
(A2) optionally one, or more second reactive diluents,
(B) one, or more oligomers, and
(C) a photoinitiator (C), wherein the amount of component (A1) is 5 to 70% by weight based on the amount of components (A1), (A2) and (B), wherein the amount of components (A1) and (A2) is 30 to 70% by weight and the amount of component (B) is 70 to 30% by weight based on the amount of components (A1) and (A2) and (B).

The amount of components (A1) and (A2) is especially 30 to 50% by weight, very especially 40 to 60% by weight based on the amount of components (A1) and (A2) and (B).

The amount of component (B) is especially 70 to 50% by weight, very especially 60 to 40% by weight based on the amount of components (A1) and (A2) and (B).

The viscosity of the photocurable compositions is in the range 10 to 3000 mPa·s, preferably 10 to 1500 mPa·s at 30° C. In case of photopolymer jetting the viscosity of the photocurable composition is adjusted to be in the range of 10 to 150 mPas at 30° C. In case of vat-based photopolymerization the viscosity of the photocurable composition is adjusted to be in the range of 50 to 1500 mPas at 30° C. Most commercial print heads require heating to reduce ink viscosity which is typically in the range of 10 to 20 mPas.

Photocurable compositions, comprising N-vinyloxazolidinone of formula (I) have a significantly lower viscosity than photocurable compositions, comprising instead of N-vinyloxazolidinone of formula (I) acryloylmorpholine (ACMO). N-vinyloxazolidinone of formula (I) provide a strong diluting effect for high viscous oligomers, offering more flexibility with respect to the development of formulations and better mechanical properties of the cured three-dimensional shaped articles, in particular balanced mechanical properties combining stiffness with high toughness.

In addition, the present invention relates to the use of the photocurable composition of the present invention in a photopolymerization 3D printing process, in particular vat polymerisation, or photopolymerjetting; and a method for producing a three-dimensional article, comprising
a) providing the photocurable composition according to the present invention,
b) exposing the photocurable composition to actinic radiation to form a cured crossection,
c) repeating steps (a) and (b) to build up a three-dimensional article.

The amount of component (A1) is 5 to 70% by weight based on the amount of components (A1), (A2) and (B).

The amount of components (A1) and (A2) is 30 to 70% by weight, especially 30 to 50% by weight, very especially 40 to 60% by weight based on the amount of components (A1) and (A2) and (B).

The amount of component (B) is 70 to 30% by weight, especially 70 to 50% by weight, very especially 60 to 40% by weight based on the amount of components (A1) (and (A2) and (B).

If the composition of the present invention comprises the second diluent (A2), it is contained in an amount of 5 to 65% by weight based on the amount of components (A1), (A2) and (B). In said embodiment the amount of component (A1) is 65 to 5% by weight based on the amount of components (A1), (A2) and (B).

In a particularly preferred embodiment the composition of the present invention does not include component (A2) and the amount of component (A1) is 30 to 70% by weight, especially 30 to 50% by weight, very especially 40 to 60% by weight and the amount of component (B) is 70 to 30% by weight, especially 70 to 50% by weight, very especially 60 to 40% by weight based on the amount of components (A1) and (B).

In said embodiment the photocurable composition comprises
(A1) a N-vinyloxazolidinone of formula

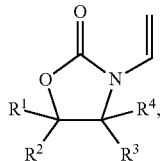 (I)

wherein
R¹, R², R³ and R⁴ are independently of each other a hydrogen atom or an organic group having not more than 10 carbon atoms,
(B) one, or more oligomers, and
(C) a photoinitiator (C), wherein the amount of component (A1) is 30 to 70% by weight, and the amount of component (B) is 70 to 30% by weight based on the amount of components (A1) and (B).

The viscosity of the photocurable compositions is in the range 10 to 3000 mPa·s, preferably 10 to 1500 mPa·s at 30° C. In case of photopolymer jetting the viscosity of the photocurable composition is adjusted to be in the range of 10 to 150 mPas at 30° C. In case of vat-based photopolymerization the viscosity of the photocurable composition is adjusted to be in the range of 50 to 1500 mPas at 30° C.

The amount of component (A1) is especially 30 to 50% by weight, very especially 40 to 60% by weight and the amount of component (B) is especially 70 to 50% by weight, very especially 60 to 40% by weight based on the amount of components (A1) and (B).

The viscosity of the photocurable compositions is in the range 10 to 3000 mPa·s, preferably 10 to 1500 mPa·s at 30° C. In case of photopolymer jetting the viscosity of the photocurable composition is adjusted to be in the range of 10 to 150 mPas at 30° C. In case of vat-based photopolymerization the viscosity of the photocurable composition is adjusted to be in the range of 50 to 1500 mPas at 30° C.

N-Vinyloxazolidinone (A1)

Preferably at least two of R¹ to R⁴ in formula (I) are a hydrogen atom.

In a particularly preferred embodiment at least two of R¹ to R⁴ in formula (I) are a hydrogen atom and any remaining R¹ to R⁴ are an organic group having not more than 10 carbon atoms.

Preferably the organic group has not more than 4 carbon atoms. In a particularly preferred embodiment the organic group is an alkyl, or alkoxy group. In a preferred embodiment the organic group is a $C_1$-$C_4$alkyl group, or a $C_1$-$C_4$alkoxy group. In a most preferred embodiment the organic group is a methyl group.

As examples of N-vinyloxazolidinone of formula (I) compounds may be mentioned, wherein
R¹, R², R³ and R⁴ are a hydrogen atom (N-vinyloxazolidinone (NVO), or
R¹ is a $C_1$-$C_4$alkyl group, in particular a methyl group, and R², R³ and R⁴ are a hydrogen atom (N-vinyl-5-methyl oxazolidinone (NVMO), or
R¹ and R² are a hydrogen atom and R³ and R⁴ are a $C_1$-$C_4$alkyl group, in particular a methyl group.

Particularly preferred are NVO and NVMO, most preferred is NVMO.

Second Diluent (A2)

The second diluent (B) may be a single diluent, or a mixture of two, or more diluents.

The second diluent (B) represents a "reactive diluent", which is a component that contains at least one free radically reactive group (e.g., an ethylenically-unsaturated group) that can co-react with components (A1) and (B) (e.g., is capable of undergoing addition polymerization).

If the composition of the present invention comprises the second diluent (A2), it is contained in an amount of 5 to 65% by weight based on the amount of components (A1), (A2) and (B).

Suitable monofunctional, difunctional, or tetrafunctional acrylate, methacrylate, or vinylamide components are listed below. Monofunctional refers to the fact that the molecule of the compound exhibits only one acrylate, methacrylate, or vinylamide functional group.

Examples of monofunctional vinylamide components include such as N-vinyl-pyrrolidone, vinyl-imidazole, N-vinylcaprolactame, N-(hydroxymethyl)vinylamide, N-hydroxyethyl vinylamide, N-isopropylvinylamide, N-isopropylmethvinylamide, N-tert-butylvinylamide, N,N'-methylenebisvinylamide, N-(isobutoxymethyl)vinylamide, N-(butoxymethyl)vinylamide, N-[3-(dimethylamino)propyl]methvinylamide, N,N-dimethylvinylamide, N,N-diethylvinylamide and N-methyl-N-vinylacetamide.

Examples of monofunctional methacrylate include isobornyl methacrylate, tetrahydrofurfuryl methacrylate, ethoxylated phenyl methacrylate, cyclohexylmethacrylate, lauryl methacrylate, stearyl methacrylate, octyl methacrylate, isodecyl methacrylate, tridecyl methacrylate, caprolactone methacrylate, nonyl phenol methacrylate, cyclic trimethylolpropane formal methacrylate, methoxy polyethyleneglycol methacrylates, methoxy polypropyleneglycol methacrylates, hydroxyethyl methacrylate, hydroxypropyl methacrylate and glycidyl methacrylate.

The photocurable composition of the present invention may contain a difunctional, or tetrafunctional diluent having two unsaturated carbon-carbon bonds, such as, for example, difunctional, or tetrafunctional (meth)acrylates.

Examples of the bifunctional monomer include 1,3-butylene glycol di(meth)acrylate, 1,4-butanediol di(meth)acrylate, diethylene glycol di(meth)acrylate, 1,6-hexanediol di(meth)acrylate, polyethylene glycol (200) di(meth)acrylate, tetraethylene glycol di(meth)acrylate, triethylene glycol di(meth)acrylate, tripropylene glycol di(meth)acrylate, polyethylene glycol (400) di(meth)acrylate, ethoxylated (3) bisphenol A di(meth)acrylate, dipropylene glycol di(meth)acrylate, alkoxylated hexanediol di(meth)acrylate, ethoxylated (4) bisphenol A di(meth)acrylate, ethoxylated (10) bisphenol A di(meth)acrylate, polyethylene glycol (600) di(meth)acrylate, tricyclodecane dimethanol di(meth)acrylate, 1,9-nonanediol di(meth)acrylate, 1,10-decanediol di(meth)acrylate, neopentyl glycol di(meth)acrylate, polytetramethylene glycol di(meth)acrylate, 3-methyl-1,5-pentanediol di(meth)acrylate, and dimethylol-tricyclodecane di(meth)acrylate. One of these may be used alone, or two or more of these may be used in combination.

Polyethylene glycol (200) diacrylate, polyethylene glycol (400) diacrylate, and polyethylene glycol (600) diacrylate mentioned above are represented by the chemical formulae below.

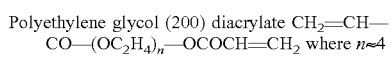
Polyethylene glycol (200) diacrylate $CH_2=CH-CO-(OC_2H_4)_n-OCOCH=CH_2$ where $n\approx4$

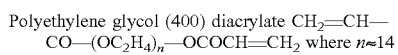
Polyethylene glycol (400) diacrylate $CH_2=CH-CO-(OC_2H_4)_n-OCOCH=CH_2$ where $n\approx14$

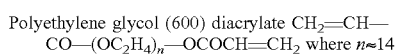
Polyethylene glycol (600) diacrylate $CH_2=CH-CO-(OC_2H_4)_n-OCOCH=CH_2$ where $n\approx14$ Examples of tetrafunctional (meth)acrylates are bistrimethylolpropane tetraacrylate, pentaerythritol tetracrylate, tetramethylolmethane tetramethacrylate, pentaerythritol tetramethacrylate, bistrimethylolpropane tetramethacrylate, ethoxylated pentaerythritol tetraacrylate, propoxylated pentaerythritol tetraacrylate, dipentaerythritol tetraacrylate, ethoxylated dipentaerythritol tetraacrylate, propoxylated dipentaerythritol tetraacrylate, aryl urethane tetraacrylates, aliphatic urethane tetraacrylates, melamine tetraacrylates, epoxy novolac tetraacrylates and polyester tetraacrylates.

The photocurable composition of the present invention may contain monofunctional acrylamides or methacrylamides. Examples include acryloylmorpholine, methacryloylmorpholine, N-(hydroxymethyl)acrylamide, N-hydroxyethyl acrylamide, N-isopropylacrylamide, N-isopropylmethacrylamide, N-tert-butylacrylamide, N,N'-methylenebisacrylamide, N-(isobutoxymethyl)acrylamide, N-(butoxymethyl)acrylamide, N-[3-(dimethylamino)propyl]methacrylamide, N,N-dimethylacrylamide, N,N-diethylacrylamide, N-(hydroxymethyl)methacrylamide, N-hydroxyethyl methacrylamide, N-isopropylmethacrylamide, N-isopropylmethmethacrylamide, N-tert-butylmethacrylamide, N,N'-methylenebismethacrylamide, N-(isobutoxymethyl)methacrylamide, N-(butoxymethyl)methacrylamide, N-[3-(dimethylamino)propyl]methmethacrylamide, N,N-dimethylmethacrylamide and N,N-diethylmethacrylamide.

Oligomer (B)

The oligomer (B) is selected from polyester (meth)acrylates, polyether (meth)acrylates, carbonate (meth)acrylates, epoxy (meth)acrylates and urethane (meth)acrylates, including amine-modified oligomers. The oligomer (B) may be single oligomer, or a mixture of two, or more oligomers.

Urethane (meth)acrylates are obtainable for example by reacting polyisocyanates with hydroxyalkyl (meth)acrylates and optionally chain extenders such as diols, polyols, diamines, polyamines, dithiols or polythiols.

Urethane (meth)acrylates of this kind comprise as synthesis components substantially:

(1) at least one organic aliphatic, aromatic or cycloaliphatic di- or polyisocyanate,
(2) at least one compound having at least one isocyanate-reactive group and at least one radically polymerizable unsaturated group, and
(3) optionally, at least one compound having at least two isocyanate-reactive groups.

Suitable components (1) are, for example, aliphatic, aromatic, and cycloaliphatic diisocyanates and polyisocyanates having an NCO functionality of at least 2, preferably 2 to 5, and more preferably more than 2 to 4.

Polyisocyanates contemplated include polyisocyanates containing isocyanurate groups, uretdione diisocyanates, polyisocyanates containing biuret groups, polyisocyanates containing urethane groups or allophanate groups, polyisocyanates comprising oxadiazinetrione groups, uretonimine-modified polyisocyantes of linear or branched $C_4$-$C_{20}$ alkylene diisocyanates, cycloaliphatic diisocyanates having a total of 6 to 20 C atoms, or aromatic diisocyanates having a total of 8 to 20 C atoms, or mixtures thereof.

Examples of customary diisocyanates are aliphatic diisocyanates such as tetramethylene diisocyanate, hexamethylene diisocyanate (1,6-diisocyanatohexane), trimethylhexamethylene diisocyanate, octamethylene diisocyanate, decamethylene diisocyanate, dodecamethylene diisocyanate, tetradecamethylene diisocyanate, derivatives of lysine diisocyanate, tetramethylxylylene diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also aromatic diisocyanates such as tolylene 2,4- or 2,6-diisocyanate and the isomer mixtures thereof, m- or p-xylylene diisocyanate, 2,4'- or 4,4'-diisocyanato-diphenylmethane and the isomer mixtures thereof, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of the stated diisocyanates may also be present.

Contemplated as component (2) in accordance with the invention is at least one compound (2) which carries at least one isocyanate-reactive group and at least one radically polymerizable group.

The compounds (2) preferably have precisely one isocyanate-reactive group and 1 to 5, more preferably 1 to 4, and very preferably 1 to 3 radically polymerizable groups.

The components (2) preferably have a molar weight of below 10 000 g/mol, more preferably below 5000 g/mol, very preferably below 4000 g/mol, and more particularly below 3000 g/mol. Special components (b) have a molar weight of below 1000 or even below 600 g/mol.

Isocyanate-reactive groups may be, for example, —OH, —SH, —NH$_2$, and —NHR$^{100}$, where R$^{100}$ is hydrogen or an alkyl group containing 1 to 4 carbon atoms, such as methyl, ethyl, n-propyl, isopropyl, n-butyl, isobutyl, sec-butyl or tert-butyl, for example. Components (2) may be, for example, monoesters of α,β-unsaturated carboxylic acids, such as acrylic acid, methacrylic acid, crotonic acid, itaconic acid, fumaric acid, maleic acid, acrylamidoglycolic acid and methacrylamidoglycolic acid, and polyols, which have preferably 2 to 20 C atoms and at least two hydroxyl groups, such as ethylene glycol, diethylene glycol, triethylene glycol, propylene 1,2-glycol, propylene 1,3-glycol, 1,1-dimethyl-1,2-ethanediol, dipropylene glycol, triethylene glycol, tetraethylene glycol, pentaethylene glycol, tripropylene glycol, 1,2-, 1,3- or 1,4-butanediol, 1,5-pentanediol, neopentyl glycol, 1,6-hexanediol, 2-methyl-1,5-pentanediol, 2-ethyl-1,4-butanediol, 1,4-dimethylolcyclohexane, 2,2-bis(4-hydroxycyclohexyl)propane, glycerol, trimethylolethane, trimethylolpropane, trimethylolbutane, pentaerythritol, ditrimethylolpropane, erythritol, sorbitol, polyethylene glycol having a molar mass of between 106 and 2000, polypropylene glycol having a molar weight of between 134 and 2000, polyTHF having a molar weight of between 162 and 2000 or poly-1,3-propanediol having a molar weight of between 134 and 400. In addition it is also possible to use esters or amides of (meth)acrylic acid with amino alcohols such as 2-aminoethanol, 2-(methylamino)ethanol, 3-amino-1-propanol, 1-amino-2-propanol or 2-(2-aminoethoxy)ethanol, for example, 2-mercaptoethanol or polyaminoalkanes, such as ethylenediamine or diethylenetriamine, or vinylacetic acid.

Also suitable, furthermore, albeit less preferably, are unsaturated polyetherols or polyesterols or polyacrylate polyols having an average OH functionality of 2 to 10.

Examples of amides of ethylenically unsaturated carboxylic acids with amino alcohols are hydroxyalkyl(meth)acrylamides such as N-hydroxymethylacrylamide, N-hydroxymethylmethacrylamide, N-hydroxyethylacrylamide, N-hydroxyethylmethacrylamide, 5-hydroxy-3-oxapentyl (meth)acrylamide, N-hydroxyalkylcrotonamides such as N-hydroxymethylcrotonamide, or N-hydroxyalkylmaleimides such as N-hydroxyethylmaleimide.

Preference is given to using 2-hydroxyethyl (meth)acrylate, 2- or 3-hydroxypropyl (meth)acrylate, 1,4-butanediol mono(meth)acrylate, neopentyl glycol mono(meth)acrylate, 1,5-pentanediol mono(meth)acrylate, 1,6-hexanediol mono (meth)acrylate, glycerol mono(meth)acrylate and di(meth) acrylate, trimethylolpropane mono(meth)acrylate and di(meth)acrylate, pentaerythritol mono(meth)acrylate, di(meth)acrylate, and tri(meth)acrylate, and also 2-aminoethyl (meth)acrylate, 2-aminopropyl (meth)acrylate, 3-aminopropyl (meth)acrylate, 4-aminobutyl (meth)acrylate, 6-aminohexyl (meth)acrylate, 2-thioethyl (meth)acrylate, 2-aminoethyl(meth)acrylamide, 2-aminopropyl(meth)acrylamide, 3-aminopropyl(meth)acrylamide, 2-hydroxyethyl (meth)acrylamide, 2-hydroxypropyl(meth)acrylamide, or 3-hydroxypropyl(meth)acrylamide. Particularly preferred are 2-hydroxyethyl acrylate, 2-hydroxyethyl methacrylate, 2- or 3-hydroxypropyl acrylate, 1,4-butanediol monoacrylate, 3-(acryloyloxy)-2-hydroxypropyl (meth)acrylate, and also the monoacrylates of polyethylene glycol with a molar mass of 106 to 238.

Contemplated as component (3) are compounds which have at least two isocyanate-reactive groups, examples being —OH, —SH, —NH$_2$ or —NH R$^{101}$, in which R$^{101}$ therein, independently of one another, may be hydrogen, methyl, ethyl, isopropyl, n-propyl, n-butyl, isobutyl, sec-butyl or tert-butyl.

Compounds (3) having precisely 2 isocyanate-reactive groups are preferably diols having 2 to 20 carbon atoms, examples being ethylene glycol, 1,2-propanediol, 1,3-propanediol, 1,1-dimethylethane-1,2-diol, 2-butyl-2-ethyl-1,3-propanediol, 2-ethyl-1,3-propanediol, 2-methyl-1,3-propanediol, neopentyl glycol, neopentyl glycol hydroxypivalate, 1,2-, 1,3- or 1,4-butanediol, 1,6-hexanediol, 1,10-decanediol, bis(4-hydroxycyclohexane)isopropylidene, tetramethylcyclobutanediol, 1,2-, 1,3- or 1,4-cyclohexanediol, cyclooctanediol, norbornanediol, pinanediol, decalindiol, 2-ethyl-1,3-hexanediol, 2,4-diethyloctane-1,3-diol, hydroquinone, bisphenol A, bisphenol F, bisphenol B, bisphenol S, 2,2-bis(4-hydroxycyclohexyl)propane, 1,1-, 1,2-, 1,3-, and 1,4-cyclohexanedimethanol, 1,2-, 1,3-, or 1,4-cyclohexanediol, polyTHF having a molar mass of between 162 and 2000, poly-1,2-propanediol or poly-1,3-propanediol having a molar mass of between 134 and 1178 or polyethylene glycol having a molar mass of between 106 and 2000, and also aliphatic diamines, such as methylene- and isopropylidene-bis(cyclohexylamine), piperazine, 1,2-, 1,3- or 1,4-diaminocyclohexane, 1,2-, 1,3-, or 1,4-cyclohexanebis(methylamine), etc., dithiols or polyfunctional alcohols, secondary or primary amino alcohols, such as ethanolamine, monopropanolamine, etc. or thio alcohols, such as thioethylene glycol.

Particularly suitable here are the cycloaliphatic diols, such as, for example, bis(4-hydroxycyclohexane)isopropylidene, tetramethylcyclobutanediol, 1,2-, 1,3-, or 1,4-cyclohexanediol, 1,1-, 1,2-, 1,3-, and 1,4-cyclohexanedimethanol, cyclooctanediol or norbornanediol.

Further compounds (3) may be compounds having at least three isocyanate-reactive groups.

For example, these components may have 3 to 6, preferably 3 to 5, more preferably 3 to 4, and very preferably 3 isocyanate-reactive groups.

The molecular weight of these components is generally not more than 2000 g/mol, preferably not more than 1500 g/mol, more preferably not more than 1000 g/mol, and very preferably not more than 500 g/mol.

The urethane (meth)acrylates preferably have a number-average molar weight $M_n$ of 500 to 20 000, in particular of 500 to 10 000 and more preferably 600 to 3000 g/mol (determined by gel permeation chromatography using tetrahydrofuran and polystyrene as standard).

Epoxy (meth)acrylates are obtainable by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers.

Examples of possible epoxidized olefins include ethylene oxide, propylene oxide, iso-butylene oxide, 1-butene oxide, 2-butene oxide, vinyloxirane, styrene oxide or epichlorohydrin, preference being given to ethylene oxide, propylene oxide, isobutylene oxide, vinyloxirane, styrene oxide or epichlorohydrin, particular preference to ethylene oxide, propylene oxide or epichlorohydrin, and very particular preference to ethylene oxide and epichlorohydrin.

Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl]methane isomers (CAS No. [66072-39-7]), phenol-based epoxy novolaks (CAS No. [9003-35-4]), and cresol-based epoxy novolaks (CAS No. [37382-79-9]).

Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl] ethane (CAS No. [27043-37-4]), diglycidyl ether of polypropylene glycol (α,ω-bis(2,3-epoxypropoxy)poly (oxypropylene), CAS No. [16096-30-3]) and of hydrogenated bisphenol A (2,2-bis[4-(2,3-epoxypropoxy)cyclohexyl]propane, CAS No. [13410-58-7]).

The epoxy (meth)acrylates preferably have a number-average molar weight $M_n$ of 200 to 20 000, more preferably of 200 to 10 000 g/mol, and very preferably of 250 to 3000 g/mol; the amount of (meth)acrylic groups is preferably 1 to 5, more preferably 2 to 4, per 1000 g of epoxy (meth) acrylate (determined by gel permeation chromatography using polystyrene as standard and tetrahydrofuran as eluent).

Carbonate (meth)acrylates comprise on average preferably 1 to 5, especially 2 to 4, more preferably 2 to 3 (meth)acrylic groups, and very preferably 2 (meth)acrylic groups.

The number-average molecular weight $M_n$ of the carbonate (meth)acrylates is preferably less than 3000 g/mol, more preferably less than 1500 g/mol, very preferably less than 800 g/mol (determined by gel permeation chromatography using polystyrene as standard, tetrahydrofuran as solvent).

The carbonate (meth)acrylates are obtainable in a simple manner by transesterifying carbonic esters with polyhydric, preferably dihydric, alcohols (diols, hexanediol for example) and subsequently esterifying the free OH groups with (meth)acrylic acid, or else by transesterification with (meth)acrylic esters, as described for example in EP-A 92 269. They are also obtainable by reacting phosgene, urea derivatives with polyhydric, e.g., dihydric, alcohols.

Also conceivable are (meth)acrylates of polycarbonate polyols, such as the reaction product of one of the aforementioned diols or polyols and a carbonic ester and also a hydroxyl-containing (meth)acrylate.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl (meth)acrylate, 2- or 3-hydroxypropyl (meth)acrylate, 1,4-butanediol mono(meth)acrylate, neopentyl glycol mono(meth)acrylate, glyceryl mono- and di(meth)acrylate, trimethylolpropane mono- and di(meth)acrylate, and pentaerythritol mono-, di-, and tri(meth)acrylate.

Particularly preferred carbonate (meth)acrylates are those of the formula:

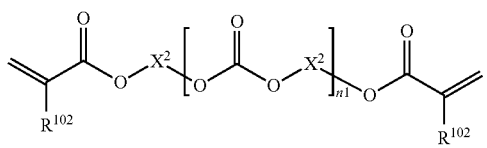

in which $R^{102}$ is H or $CH_3$, $X^2$ is a $C_2$-$C_{18}$ alkylene group, and n1 is an integer from 1 to 5, preferably 1 to 3.

$R^{102}$ is preferably H and $X^2$ is preferably $C_2$ to $C_{10}$ alkylene, examples being 1,2-ethylene, 1,2-propylene, 1,3-propylene, 1,4-butylene, and 1,6-hexylene, more preferably $C_4$ to $C_8$ alkylene. With very particular preference $X^2$ is $C_6$ alkylene.

The carbonate (meth)acrylates are preferably aliphatic carbonate (meth)acrylates.

Among the oligomers (B) urethane (meth)acrylates are particularly preferred.

A urethane (meth)acrylate may refer to a single urethane (meth)acrylate or to a mixture of different urethane (meth)acrylates. Suitable urethane (meth)acrylates can be monofunctional, but preferably are difunctional, or of higher functionality. The functionality refers to the number of (meth)acrylate functional groups exhibited by the compound.

Preferred are urethane (meth)acrylates made from polyetherdiols, or polyester diols, aliphatic, aromatic, or cyclic diisocyanates and hydroxyalkyl (meth)acrylates. More preferred are urethane (meth)acrylates made from polyester diols, aromatic, or cyclic diisocyanates and hydroxyalkyl (metha)crylates.

The diisocyanates are preferably selected from 4,4'-, 2,4'- and/or 2,2'-methylenedicyclohexyl diisocyanate (H12MDI), isophorone diisocyanates (IPDI) and tolylene 2,4- and/or 2,6-diisocyanate (TDI).

The hydroxyalkyl (meth)acrylates are preferably selected from 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate, and 4-hydroxybutyl acrylate.

Also preferred are urethane (meth)acrylates made from lactones of formula

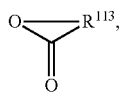 (B)

aliphatic, aromatic, or cyclic diisocyanates and hydroxyalkyl (meth)acrylates. More preferred are urethane (meth)acrylates made from caprolactone, aliphatic, or cyclic diisocyanates and hydroxyalkyl (meth)acrylates.

The diisocyanates are preferably selected from di(isocyanatocyclohexyl)methane, 2,2,4- and 2,4,4-trimethylhexane diisocyanate, and especially 4,4'-, 2,4'- and/or 2,2'-methylenedicyclohexyl diisocyanate (H12MDI).

The hydroxyalkyl (meth)acrylates are preferably selected from 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate, and 4-hydroxybutyl acrylate.

Also preferred are those having polyfunctionality of (meth)acrylates or mixed acrylic and methacrylic functionality.

In a preferred embodiment the polyester urethane (meth)acrylate (B) is obtained by reacting
(B1) a hydroxyalkylacrylate, or hydroxyalkylmethacrylate,
(B2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof, especially an aliphatic diisocyanate, cycloaliphatic diisocyanate, or an aromatic diisocyanate, or mixtures thereof,
(B3) a polyester polyol, which is derived from aliphatic dicarboxylic acids and aliphatic diols, and (B4) optionally a secondary polyol, especially glycerol.

The hydroxyalkylacrylate, or hydroxyalkylmethacrylate (B1) is preferably a compound of formula

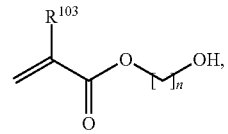

wherein $R^{103}$ is a hydrogen atom, or a methyl group, and n is 2 to 6, especially 2 to 4. Examples of (B1) include 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate and 4-hydroxybutyl acrylate. 2-Hydroxyethyl acrylate is most preferred.

Hydroxyalkylacrylates, or hydroxyalkylmethacrylates (B1) having shorter alkyl chains (n is 2 to 4, especially 2) lead to a higher E modulus of the UV cured composition. Hydroxyalkyl-methacrylates (B1) lead to a higher E modulus as compared to hydroxyalkylacrylates.

The organic diisocyanate (B2) used for making the polyester urethane acrylate is either an aliphatic, a cycloaliphatic, or an aromatic diisocyanate.

Examples of customary aliphatic and cycloaliphatic diisocyanates are tri-, tetra-, penta-, hexa-, hepta- and/or octamethylene diisocyanate, 2-methylpentamethylene 1,5-diisocyanate, 2-ethyltetramethylene 1,4-diisocyanate, hexamethylene 1,6-diisocyanate (HDI), pentamethylene 1,5-diisocyanate, butylene 1,4-diisocyanate, trimethylhexamethylene 1,6-diisocyanate, 1-isocyanato-3,3,5-trimethyl-5-isocyanatomethylcyclohexane (isophorone diisocyanate, IPDI), 1,4- and/or 1,3-bis(isocyanatomethyl) cyclohexane (HXDI), 1,4-cyclohexane diisocyanate, 1-methyl-2,4- and/or 1-methyl-2,6-cyclohexane diisocyanate, 4,4'-, 2,4'- and/or 2,2'-methylenedicyclohexyl diisocyanate (H12MDI).

Preferred aliphatic and cycloaliphatic polyisocyanates are hexamethylene 1,6-diisocyanate (HDI), 1-isocyanato-3,3,5-trimethyl-5-isocyanatomethylcyclohexane (isophorone diisocyanate, IPDI) and 4,4'-, 2,4'- and/or 2,2'-methylenedicyclohexyl diisocyanate (H12MDI); particular preference is given to H12MDI and IPDI or mixtures thereof.

Suitable aromatic diisocyanates include naphthylene 1.5-diisocyanate (NDI), tolylene 2,4- and/or 2,6-diisocyanate (TDI), diphenylmethane 2,2'-, 2,4'- and/or 4,4'-diisocyanate (MDI), 3,3'-dimethyl-4,4'-diisocyanato-diphenyl (TODI), p-phenylene diisocyanate (PDI), diphenylethan-4,4'-diisoyanate (EDI), diphenylmethandiisocyanate, 3,3'-dimethyl-diphenyl-diisocyanate, 1,2-diphenylethandiisocyanate and/or phenylene diisocyanat.

The at present most preferred diisocyanates are 4,4'-, 2,4'- and/or 2,2'-methylenedicyclohexyl diisocyanate (H12MDI), isophorone diisocyanates (IPDI), or tolylene 2,4- and/or 2,6-diisocyanate (TDI).

Polyester polyols (B3) derived from dicarboxylic acid and diols are preferred and, for example, described in US20160122465. The dicarboxylic acids used for making the polyester polyol include aliphatic, or cycloaliphatic dicarboxylic acids, or combinations thereof. Among them, aliphatic dicarboxylic acids are preferred. Suitable aliphatic dicarboxylic acids which can be used alone or in mixture typically contain from 4 to 12 carbon atoms and include: succinic acid, glutaric acid, adipic acid, pimelic acid, suberic acid, and the like. Adipic acid is preferred.

The diols used for making the polyester polyol include aliphatic, or cycloaliphatic diols, or combinations thereof, preferably aliphatic diols containing 2 to 8 carbon atoms and more preferably 2 to 6 carbon atoms. Some representative examples of aliphatic diols that can be used include ethylene glycol, 1,3-propanediol, 1,4-butanediol, 1,5-pentanediol, 1,6-hexanediol and the like.

In a preferred embodiment, only one kind of aliphatic dicarboxylic acid is used in making the polyester polyol. In another preferred embodiment, one or two kinds of aliphatic diols are used in making the polyester polyol. Most preferably, the polyester polyol is derived from adipic acid and ethylene glycol and 1,4-butanediol (poly(ethylene 1,4-butylene adipate) diol, PEBA). In the PEBA, the molar ratio of ethylene glycol to 1,4-butanediol is from 0.05:1 to 10:1, preferably from 0.2:1 to 5:1, more preferably 0.5:1 to 1.5:1, most preferred from 0.75:1 to 1.25:1.

The linear polyester polyol will typically have a number average molecular weight within the range of $4 \times 10^2$ to $7.0 \times 10^3$, preferably $8 \times 10^2$ to $6.0 \times 10^3$, more preferably $1 \times 10^3$ to $5.0 \times 10^3$. In a preferred embodiment, the linear polyol is polyester polyol derived from one kind of aliphatic dicarboxylic acid and two kinds of aliphatic diols and has a number average molecular weight of from $2.0 \times 10^3$ to $4.0 \times 10^3$. In another preferred embodiment, the linear polyol is polyester polyol derived from one kind of aliphatic dicarboxylic acid and one kind of aliphatic diol and has a number average molecular weight of from $1.5 \times 10^3$ to $4.0 \times 10^3$, and more preferably from $1.8 \times 10^3$ to $3.5 \times 10^3$. All molecular weights specified in this text have the unit of [g/mol] and refer, unless indicated otherwise, to the number average molecular weight (Mn).

The polyester urethane acrylates, or methacrylates (A) have viscosities in the range of 2000 to 20000 mPas at 60° C.

A secondary polyol, such as, for example, glycerol, may be used, to finetune the mechanical properties of the inventive urethane (meth)acrylates by introducing linear or branched structural elements.

In another preferred embodiment the polyester urethane (meth)acrylate (B) is obtained by reacting a hydroxyalkyl (meth)acrylate of formula

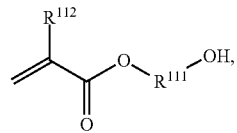

(A)

with a lactone of formula

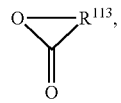

(B)

and at least one cycloaliphatic or asymmetric aliphatic diisocyanate, wherein $R^{111}$ is a divalent alkylene radical having 2 to 12 carbon atoms and which may optionally be substituted by $C_1$-$C_4$alkyl groups and/or interrupted by one or more oxygen atoms, $R^{112}$ in each case independently of any other is methyl or hydrogen, $R^{113}$ is a divalent alkylene radical having 1 to 12 carbon atoms and which may optionally be substituted by $C_1$ to $C_4$ alkyl groups and/or interrupted by one or more oxygen atoms. Reference is made to WO14191228A1

$R^{111}$ is preferably selected from the group consisting of 1,2-ethylene, 1,2- or 1,3-propylene, 1,2-, 1,3-, or 1,4-butylene, 1,1-dimethyl-1,2-ethylene, 1,2-dimethyl-1,2-ethylene, 1,5-pentylene, 1,6-hexylene, 1,8-octylene, 1,10-decylene, and 1,12-dodecylene.

$R^{113}$ is preferably selected from the group consisting of methylene, 1,2-ethylene, 1,2-propylene, 1,3-propylene, 1,2-butylene, 1,3-butylene, 1,4-butylene, 1,5-pentylene, 1,5-hexylene, 1,6-hexylene, 1,8-octylene, 1,10-decylene, 1,12-dodecylene, 2-oxa-1,4-butylene, 3-oxa-1,5-pentylene, and 3-oxa-1,5-hexylene.

The hydroxyalkyl(meth)acrylate of formula (A) is preferably selected from the group consisting of 2-hydroxyethyl (meth)acrylate, 2- or 3-hydroxypropyl(meth)acrylate, 1,4-butanediol mono(meth)acrylate, neopentyl glycol mono (meth)acrylate, 1,5-pentanediol mono(meth)acrylate, and 1,6-hexanediol mono(meth)acrylate.

The lactone of formula

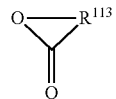

(B)

is preferably selected from the group consisting of β-propiolactone, γ-butyrolactone, γ-ethyl-gamma-butyrolactone, γ-valerolactone, delta-valerolactone, ε-caprolactone, 7-methyloxepan-2-one, 1,4-dioxepan-5-one, oxacyclotridecan-2-one, and 13-butyl-oxacyclotridecan-2-one.

Cycloaliphatic diisocyanates are 1,4-, 1,3-, or 1,2-diisocyanatocyclohexane, 4,4'-, 2,4'-and/or 2,2'-methylenedicyclohexyl diisocyanate (H12MDI), bis(isocyanatomethyl)bicyclo[2.2.1]heptane (NBDI), 1-isocyanato-3,3,5-trimethyl-5-(isocyanatomethyl)cyclohexane(isophorone diisocyanate), 1,3- or 1,4-bis(isocyanatomethyl)cyclohexane or 2,4- or 2,6-diisocyanato-1-methylcyclohexane, and also 3(or 4),8(or 9)-bis(isocyanatomethyl)tricyclo [5.2.1.0²·⁶]decane isomer mixtures.

Asymmetric aliphatic diisocyanates are derivatives of lysine diisocyanate, or tetramethylxylylene diisocyanate, trimethylhexane diisocyanate, or tetramethylhexane diisocyanate.

Very particular preference is given to di(isocyanatocyclohexyl)methane, 2,2,4- and 2,4,4-trimethylhexane diisocyanate, and especially 4,4'-, 2,4'- and/or 2,2'-methylenedicyclohexyl diisocyanate (H12MDI).

The urethane (meth)acrylates can be in particular produced by reacting ε-caprolactone, 4,4'-, 2,4'- and/or 2,2'-methylenedicyclohexyl diisocyanate (H12MDI) and hydroxyethylacrylate.

In another preferred embodiment the polyester urethane (meth)acrylate (B) is obtained by reacting a polyalkylene glycol with a lactone of formula

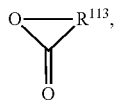

(B)

at least one cycloaliphatic or asymmetric aliphatic diisocyanate, and an hydroxyalkyl(meth)acrylate of formula (A).

The hydroxyalkyl(meth)acrylate of formula (A) is preferably selected from the group consisting of 2-hydroxyethyl (meth)acrylate, 2- or 3-hydroxypropyl(meth)acrylate, 1,4-butanediol mono(meth)acrylate, neopentyl glycol mono (meth)acrylate, 1,5-pentanediol mono(meth)acrylate, and 1,6-hexanediol mono(meth)acrylate.

The urethane (meth)acrylates can be in particular produced by reacting a polyalkylene glycol, preferably a polyethylene glycol, with ε-caprolactone, 4,4'-, 2,4'- and/or 2,2'-methylenedicyclohexyl diisocyanate (H12MDI) and hydroxyethylacrylate.

Photoinitiator (C)

The photoinitiator (C) may be a single compound, or a mixture of compounds.

Examples of photoinitiators (C) are known to the person skilled in the art and for example published by Kurt Dietliker in "A compilation of photoinitiators commercially available for UV today", Sita Technology Textbook, Edinburgh, London, 2002.

In a preferred embodiment the photoinitiator (C) is selected from acylphosphine oxide compounds, benzophenone compounds, alpha-aminoketone compounds, phenylglyoxylate compounds, oxime ester compounds, mixtures thereof and mixtures with alpha-hydroxy ketone compounds, or alpha-alkoxyketone compounds.

Examples of suitable acylphosphine oxide compounds are of the formula XII

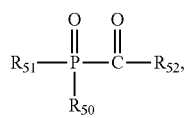

(XII)

wherein
$R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{50}$ is unsubstituted $C_1$-$C_{20}$alkyl or is $C_1$-$C_{20}$alkyl which is substituted by one or more halogen, $C_1$-$C_{12}$alkoxy, $C_1$-$C_{12}$alkylthio, $NR_{53}R_{54}$ or by —(CO)—O—$C_1$-$C_{24}$alkyl;
$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{51}$ is —(CO)R'$_{52}$; or $R_{51}$ is $C_1$-$C_{12}$alkyl which is unsubstituted or substituted by one or more halogen, $C_1$-$C_{12}$alkoxy, $C_1$-$C_{12}$alkylthio, or by $NR_{53}R_{54}$;
$R_{52}$ and R'$_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;
$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl;

In a particularly preferred embodiment the photoinitiator (C) is a compound of the formula (XII), such as, for example, bis(2,4,6-trimethylbenzoyl)-phenylphosphine oxide; 2,4,6-trimethylbenzoyl-diphenyl-phosphine oxide; ethyl (2,4,6 trimethylbenzoyl phenyl) phosphinic acid ester; (2,4,6-trimethylbenzoyl)-2,4-dipentoxyphenylphosphine oxide and bis(2,6-dimethoxybenzoyl)-2,4,4-trimethylpentylphosphine oxide.

Interesting further are mixtures of the compounds of the formula (XII) with compounds of the formula (XI) as well as mixtures of different compounds of the formula (XII).

Examples are mixtures of bis(2,6-dimethoxybenzoyl)-2, 4,4-trimethylpentylphosphine oxide with 1-hydroxy-cyclohexyl-phenyl-ketone, of bis(2,4,6-trimethylbenzoyl)-phenylphosphine oxide with 2-hydroxy-2-methyl-1-phenyl-propan-1-one, of bis(2,4,6-trimethylbenzoyl)-phenylphosphine oxide with ethyl (2,4,6 trimethylbenzoyl phenyl) phosphinic acid ester, etc.

Examples of suitable benzophenone compounds are compounds of the formula

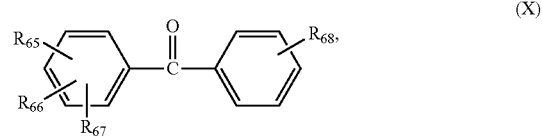

(X)

wherein
$R_{65}$, $R_{66}$ and $R_{67}$ independently of one another are hydrogen, $C_1$-$C_4$alkyl, $C_1$-$C_4$-halogenalkyl, $C_1$-$C_4$alkoxy, Cl or N($C_1$-$C_4$alkyl)$_2$;
$R_{68}$ is hydrogen, $C_1$-$C_4$alkyl, $C_1$-$C_4$halogenalkyl, phenyl, N($C_1$-$C_4$alkyl)$_2$, COOCH$_3$,

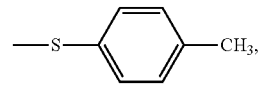

-continued $$-O-(CH_2)_n-\overset{R_{69}}{\underset{}{C}}-\overset{O}{\underset{}{C}}-A-Q\left[A-\overset{O}{\underset{}{C}}-\overset{R_{69}}{\underset{}{C}}-(CH_2)_n-O-\phenyl-\overset{O}{\underset{}{C}}-\phenyl\right]_x \text{ or}$$

$$-O-\underset{H_2}{C}-\overset{O}{\underset{}{C}}+O-(CH_2)_4\}_m O-\overset{O}{\underset{}{C}}-\underset{H_2}{C}-O-\phenyl-\overset{O}{\underset{}{C}}-\phenyl;$$

Q is a residue of a polyhydroxy compound having 2 to 6 hydroxy groups;

x is a number greater than 1 but no greater than the number of available hydroxyl groups in Q;

A is —[O(CH$_2$)$_b$CO]$_y$— or —[O(CH$_2$)$_b$CO]$_{(y-1)}$—[O(CHR$_{69}$CHR$_{69'}$)$_a$]$_y$—;

R$_{69}$ and R$_{69'}$ independently of one another are hydrogen, methyl or ethyl; and if n (or a) is greater than 1 the radicals R$_{69}$ may be the same as or different from each other;

a is a number from 1 to 2;

b is a number from 4 to 5;

y is a number from 1 to 10;

n is; and m is an integer 2-10.

Specific examples are benzophenone, Esacure TZT® available from IGM, (a mixture of 2,4,6-trimethylbenzophenone and 4-methylbenzophenone), 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)benzophenone, 3,3'-dimethyl-4-methoxybenzophenone, methyl-2-benzoylbenzoate, 4-(2-hydroxyethylthio)benzophenone, 4-(4-tolylthio) benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride; [4-(2-hydroxy-ethylsulfanyl)-phenyl]-(4-isopropylphenyl)-methanone; biphenyl-[4-(2-hydroxy-ethylsulfanyl)-phenyl]-methanone; biphenyl-4-yl-phenyl-methanone; biphenyl-4-yl-p-tolyl-methanone; biphenyl-4-yl-m-tolyl-methanone; [4-(2-hydroxy-ethylsulfanyl)-phenyl]-p-tolyl-methanone; [4-(2-hydroxy-ethylsulfanyl)-phenyl]-(4-isopropyl-phenyl)-methanone; [4-(2-hydroxy-ethylsulfanyl)-phenyl]-(4-methoxy-phenyl)-methanone; 1-(4-benzoyl-phenoxy)-propan-2-one; [4-(2-hydroxy-ethylsulfanyl)-phenyl]-(4-phenoxy-phenyl)-methanone; 3-(4-benzoyl-phenyl)-2-dimethylamino-2-methyl-1-phenyl-propan-1-one; (4-chloro-phenyl)-(4-octylsulfanyl-phenyl)-methanone; (4-chloro-phenyl)-(4-dodecylsulfanyl-phenyl)-methanone; (4-bromo-phenyl)-(4-octylsulfanyl-phenyl)-methanone; (4-dodecylsulfanyl-phenyl)-(4-methoxy-phenyl)-methanone; (4-benzoyl-phenoxy)-acetic acid methyl ester; biphenyl-[4-(2-hydroxy-ethylsulfanyl)-phenyl]-methanone; 1-[4-(4-benzoylphenylsulfanyl)phenyl]-2-methyl-2-(4-methylphenylsulfonyl)propan-1-one (Esacure®1001 available from IGM).

Examples of suitable alpha-hydroxy ketone, alpha-alkoxyketone or alpha-aminoketone compounds are of the formula $$R_{30}-\phenyl(R_{29})-\overset{O}{\underset{}{C}}-\overset{R_{31}}{\underset{R_{33}}{C}}-R_{32}, \quad (XI)$$

wherein

R$_{29}$ is hydrogen or C$_1$-C$_{18}$alkoxy;

R$_{30}$ is hydrogen, C$_1$-C$_{18}$alkyl, C$_1$-C$_{12}$hydroxyalkyl, C$_1$-C$_{18}$alkoxy, OCH$_2$CH$_2$—OR$_{34}$, morpholino, S—C$_1$-C$_{18}$alkyl, a group —HC=CH$_2$, —C(CH$_3$)=CH$_2$, $$R_{32}-\overset{R_{33}}{\underset{R_{31}}{C}}-\overset{O}{\underset{}{C}}-\phenyl-\overset{R_{35}}{\underset{H}{C}}-,$$

[indane structure with —C(CH$_3$)$_2$—C(=O)—C(CH$_3$)$_2$—OH], $$H_3C-\overset{CH_3}{\underset{CH_2}{C}}-\phenyl-\overset{O}{\underset{}{C}}-\overset{CH_3}{\underset{CH_3}{C}}-OH,$$

[indane structure with —C(=O)—C(CH$_3$)$_2$—OH];

$$R_{32}-\overset{R_{33}}{\underset{R_{31}}{C}}-\overset{O}{\underset{}{C}}-\phenyl-O- \text{ or}$$

$$\left[O-(CH_2)_5-\overset{O}{\underset{}{C}}\right]_D OCH_2CH_2-O-$$

$$H_3C-Si\left[O-(CH_2)_5-\overset{O}{\underset{}{C}}\right]_E OCH_2CH_2-O-\phenyl-\overset{O}{\underset{}{C}}-\overset{CH_3}{\underset{CH_3}{C}}-OH$$

$$\left[O-(CH_2)_5-\overset{O}{\underset{}{C}}\right]_f OCH_2CH_2-O-\phenyl-\overset{O}{\underset{}{C}}-\overset{CH_3}{\underset{CH_3}{C}}-OH$$

D, E and f are 1-3;

c is 2-10;

G$_1$ and G$_2$ independently of one another are end groups of the polymeric structure, preferably hydrogen or methyl;

R$_{34}$ is hydrogen, $$-\overset{O}{\underset{}{C}}-CH=CH_2 \quad \text{or} \quad -\overset{O}{\underset{}{C}}-\overset{CH_3}{\underset{}{C}}=CH_2;$$

$R_{31}$ is hydroxy, $C_1$-$C_{16}$alkoxy, morpholino, dimethylamino or —O(CH$_2$CH$_2$O)$_g$—C$_1$-C$_{16}$alkyl;

g is 1-20;

$R_{32}$ and $R_{33}$ independently of one another are hydrogen, $C_1$-$C_6$alkyl, $C_1$-$C_{16}$alkoxy or —O(CH$_2$CH$_2$O)$_g$—C$_1$-C$_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;

$R_{35}$ is hydrogen, OR$_{36}$ or NR$_{37}$R$_{38}$;

$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

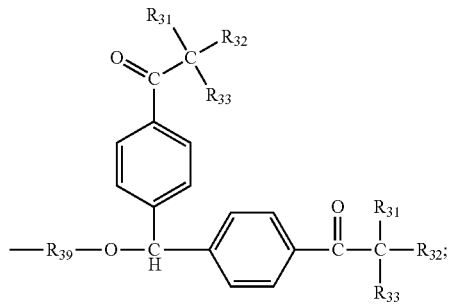

$R_{37}$ and $R_{38}$ independently of each other are hydrogen or $C_1$-$C_{12}$alkyl which is unsubstituted or is substituted by one or more OH;

$R_{39}$ is $C_1$-$C_{12}$alkylene which optionally is interrupted by one or more non-consecutive O, —(CO)—NH—C$_1$-C$_{12}$alkylene-NH—(CO)— or

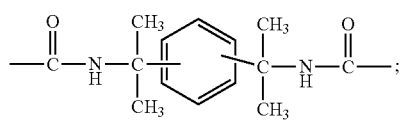

with the proviso that $R_{31}$, $R_{32}$ and $R_{33}$ not all together are $C_1$-$C_{16}$alkoxy or —O(CH$_2$CH$_2$O)$_g$—C$_1$-C$_{16}$alkyl.

Specific examples are 1-hydroxy-cyclohexyl-phenyl-ketone or a mixture of 1-hydroxy-cyclohexyl-phenyl-ketone with benzophenone), 2-methyl-1 [4-(methylthio)phenyl]-2-morpholinopropan-1-one, 2-benzyl-2-dimethylamino-1-(4-morpholinophenyl)-butan-1-one, 2-dimethylamino-2-(4-methyl-benzyl)-1-(4-morpholin-4-yl-phenyl)-butan-1-one, (3,4-dimethoxy-benzoyl)-1-benzyl-1-dimethylamino propane, 1-[4-(2-hydroxyethoxy)-phenyl]-2-hydroxy-2-methyl-1-propan-1-one, 2,2-dimethoxy-1,2-diphenylethan-1-one, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 2-hydroxy-1-{4-[4-(2-hydroxy-2-methyl-propionyl)-phenoxy]-phenyl}-2-methyl-propan-1-one, Esacure KIP provided by IGM, 2-hydroxy-1-{1-[4-(2-hydroxy-2-methyl-propionyl)-phenyl]-1,3,3-trimethyl-indan-5-yl}-2-methyl-propan-1-one.

Examples of suitable phenylglyoxylate compounds are of the formula

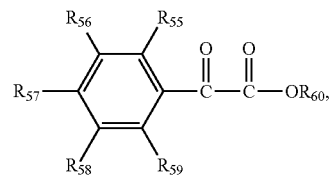

(XIII)

wherein $R_{60}$ is hydrogen, $C_1$-$C_{12}$alkyl or

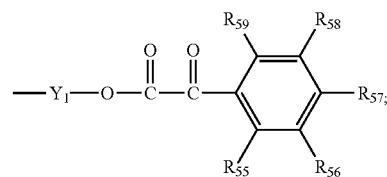

$R_{55}$, $R_{56}$, $R_{57}$, $R_{58}$ and $R_{59}$ independently of one another are hydrogen, unsubstituted $C_1$-$C_{12}$alkyl or $C_1$-$C_{12}$alkyl substituted by one or more OH, $C_1$-$C_4$alkoxy, phenyl, naphthyl, halogen or by CN; wherein the alkyl chain optionally is interrupted by one or more oxygen atoms; or $R_{55}$, $R_{56}$, $R_{57}$, $R_{58}$ and $R_{59}$ independently of one another are $C_1$-$C_4$alkoxy, $C_1$-$C_4$alkythio or NR$_{52}$R$_{53}$;

$R_{52}$ and $R_{53}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{52}$ and $R_{53}$ independently of one another are $C_2$-$C_{12}$-alkenyl, cyclopentyl, cyclohexyl, benzyl or phenyl; and $Y_1$ is $C_1$-$C_{12}$alkylene optionally interrupted by one or more oxygen atoms.

Specific examples of the compounds of the formula XIII are oxo-phenyl-acetic acid 2-[2-(2-oxo-2-phenyl-acetoxy)-ethoxy]-ethyl ester (Irgacure®754), methyl α-oxo benzeneacetate.

Examples of suitable oxime ester compounds are of the formula

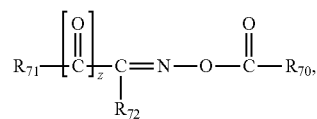

(XIV)

wherein z is 0 or 1;

$R_{70}$ is hydrogen, $C_3$-$C_8$cycloalkyl; $C_1$-$C_{12}$alkyl which is unsubstituted or substituted by one or more halogen, phenyl or by CN; or $R_{70}$ is $C_2$-$C_5$alkenyl; phenyl which is unsubstituted or substituted by one or more $C_1$-$C_6$alkyl, halogen, CN, OR$_{73}$, SR$_{74}$ or by NR$_{75}$R$_{76}$; or $R_{70}$ is $C_1$-$C_8$alkoxy, benzyloxy; or phenoxy which is unsubstituted or substituted by one or more $C_1$-$C_6$alkyl or by halogen;

$R_{71}$ is phenyl, naphthyl, benzoyl or naphthoyl, each of which is substituted by one or more halogen, $C_1$-$C_{12}$alkyl, $C_3$-$C_8$cycloalkyl, benzyl, phenoxycarbonyl, $C_2$-$C_{12}$alkoxycarbonyl, OR$_{73}$, SR$_{74}$, SOR$_{74}$, SO$_2$R$_{74}$ or by NR$_{75}$R$_{76}$, wherein the substituents OR$_{73}$, SR$_{74}$ and NR$_{75}$R$_{76}$ optionally form 5- or 6-membered rings via the radicals $R_{73}$, $R_{74}$, $R_{75}$ and/or $R_{76}$ with further substituents on the phenyl or naphthyl ring; or each of which is substituted by phenyl or by phenyl which is substituted by one or more $OR_{73}$, $SR_{74}$ or by $NR_{75}R_{66}$;

or $R_{71}$ is thioxanthyl, or

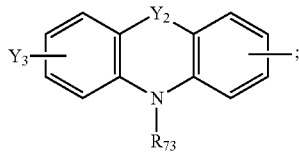

$R_{72}$ is hydrogen; unsubstituted $C_1$-$C_{20}$alkyl or $C_1$-$C_{20}$alkyl which is substituted by one or more halogen, $OR_{73}$, $SR_{74}$, $C_3$-$C_8$cycloalkyl or by phenyl; or is $C_3$-$C_8$cycloalkyl; or is phenyl which is unsubstituted or substituted by one or more $C_1$-$C_6$alkyl, phenyl, halogen, $OR_{73}$, $SR_{74}$ or by $NR_{75}R_{76}$; or is $C_2$-$C_{20}$alkanoyl or benzoyl which is unsubstituted or substituted by one or more $C_1$-$C_6$alkyl, phenyl, $OR_{73}$, $SR_{74}$ or by $NR_{75}R_{76}$; or is $C_2$-$C_{12}$alkoxycarbonyl, phenoxycarbonyl, CN, $CONR_{75}R_{76}$, $NO_2$, $C_1$-$C_4$haloalkyl, $S(O)_y$—$C_1$-$C_6$alkyl, or $S(O)_y$-phenyl, y is 1 or 2;

$Y_2$ is a direct bond or no bond;

$Y_3$ is $NO_2$ or

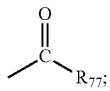

$R_{73}$ and $R_{74}$ independently of one another are hydrogen, $C_1$-$C_{20}$alkyl, $C_2$-$C_{12}$alkenyl, $C_3$-$C_8$cycloalkyl, $C_3$-$C_8$cycloalkyl which is interrupted by one or more, preferably 2, O, phenyl-$C_1$-$C_3$alkyl; or are $C_1$-$C_8$alkyl which is substituted by OH, SH, CN, $C_1$-$C_8$alkoxy, $C_1$-$C_8$alkanoyl, $C_3$-$C_8$cycloalkyl, by $C_3$-$C_8$cycloalkyl which is interrupted by one or more O, or which $C_1$-$C_8$alkyl is substituted by benzoyl which is unsubstituted or substituted by one or more $C_1$-$C_6$alkyl, halogen, OH, $C_1$-$C_4$alkoxy or by $C_1$-$C_4$alkylsulfanyl; or are phenyl or naphthyl, each of which is unsubstituted or substituted by halogen, $C_1$-$C_{12}$alkyl, $C_1$-$C_{12}$alkoxy, phenyl-$C_1$-$C_3$alkyloxy, phenoxy, $C_1$-$C_{12}$alkylsulfanyl, phenylsulfanyl, $N(C_1$-$C_{12}$alkyl$)_2$, diphenylamino or by

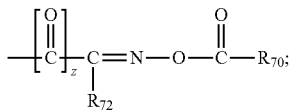

$R_{75}$ and $R_{76}$ independently of each other are hydrogen, $C_1$-$C_{20}$alkyl, $C_2$-$C_4$hydroxyalkyl, $C_2$-$C_{10}$alkoxyalkyl, $C_2$-$C_5$alkenyl, $C_3$-$C_8$cycloalkyl, phenyl-$C_1$-$C_3$alkyl, $C_1$-$C_8$alkanoyl, $C_3$-$C_{12}$alkenoyl, benzoyl; or are phenyl or naphthyl, each of which is unsubstituted or substituted by $C_1$-$C_{12}$alkyl, benzoyl or by $C_1$-$C_{12}$alkoxy; or $R_{75}$ and $R_{76}$ together are $C_2$-$C_6$alkylene optionally interrupted by O or $NR_{73}$ and optionally are substituted by hydroxyl, $C_1$-$C_4$alkoxy, $C_2$-$C_4$alkanoyloxy or by benzoyloxy;

$R_{77}$ is $C_1$-$C_{12}$alkyl, thienyl or phenyl which is unsubstituted or substituted by $C_1$-$C_{12}$alkyl, $OR_{73}$, morpholino or by N-carbazolyl.

Specific examples are 1,2-octanedione 1-[4-(phenylthio)phenyl]-2-(O-benzoyloxime), ethanone 1-[9-ethyl-6-(2-methylbenzoyl)-9H-carbazol-3-yl]-1-(0-acetyloxime), 9H-thioxanthene-2-carboxaldehyde 9-oxo-2-(O-acetyloxime), ethanone 1-[9-ethyl-6-(4morpholinobenzoyl)-9H-carbazol-3-yl]-1-(0-acetyloxime), ethanone 1-[9-ethyl-6-(2-methyl-4-(2-(1,3-dioxo-2-dimethyl-cyclopent-5-yl)ethoxy)-benzoyl)-9H-carbazol-3-yl]-1-(O-acetyloxime) (Adeka N-1919), ethanone 1-[9-ethyl-6-nitro-9H-carbazol-3-yl]-1-[2-methyl-4-(1-methyl-2-methoxy)ethoxy)phenyl]-1-(0-acetyloxime) (Adeka NCI831), etc.

It is also possible to add cationic photoinitiators, such as benzoyl peroxide (other suitable peroxides are described in U.S. Pat. No. 4,950,581, column 19, lines 17-25), or aromatic sulfonium, phosphonium or iodonium salts, such as are described, for example, in U.S. Pat. No. 4,950,581, column 18, line 60 to column 19, line 10.

Suitable sulfonium salt compounds are of formula

 (XVa)

 (XVb)

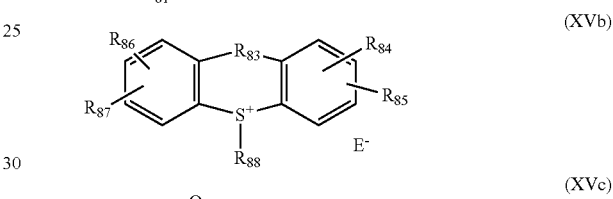 (XVc)

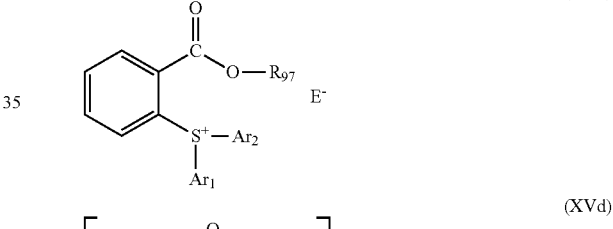 (XVd)

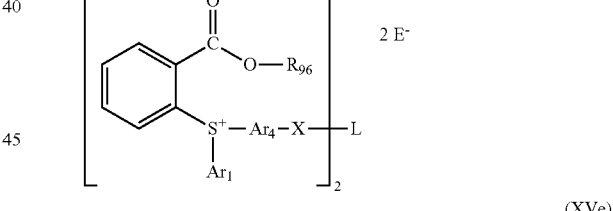 (XVe)

wherein $R_{80}$, $R_{81}$ and $R_{82}$ are each independently of the others unsubstituted phenyl, or phenyl substituted by —S-phenyl,

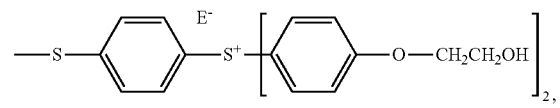

-continued

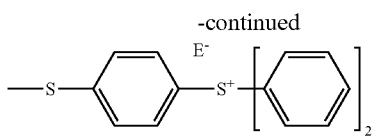

or by

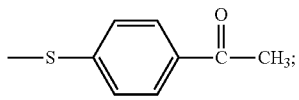

$R_{83}$ is a direct bond, S, O, $CH_2$, $(CH_2)_2$, CO or $NR_{89}$;
$R_{84}$, $R_{85}$, $R_{86}$ and $R_{87}$ independently of one another are hydrogen, $C_1$-$C_{20}$alkyl, $C_3$-$C_8$cycloalkyl, $C_1$-$C_{20}$alkoxy, $C_2$-$C_{20}$alkenyl, CN, OH, halogen, $C_1$-$C_6$alkylthio, phenyl, naphthyl, phenyl-$C_1$-$C_7$alkyl, naphtyl-$C_1$-$C_3$alkyl, phenoxy, naphthyloxy, phenyl-$C_1$-$C_7$alkyloxy, naphtyl-$C_1$-$C_3$alkyloxy, phenyl-$C_2$-$C_6$alkenyl, naphthyl-$C_2$-$C_4$alkenyl, S-phenyl, $(CO)R_{89}$, $O(CO)R_{89}$, $(CO)OR_{89}$, $SO_2R_{89}$ or $OSO_2R_{89}$;
$R_{88}$ is $C_1$-$C_{20}$alkyl, $C_1$-$C_{20}$hydroxyalkyl,

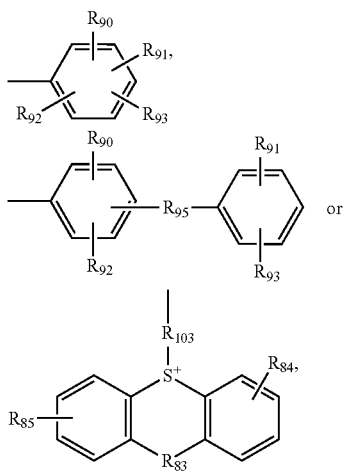

$R_{89}$ is hydrogen, $C_1$-$C_{12}$alkyl, $C_1$-$C_{12}$hydroxyalkyl, phenyl, naphthyl or biphenylyl;
$R_{90}$, $R_{91}$, $R_{92}$ and $R_{93}$ independently of one another have one of the meanings as given for $R_{84}$; or $R_{90}$ and $R_{91}$ are joined to form a fused ring system with the benzene rings to which they are attached;
$R_{95}$ is a direct bond, S, O or $CH_2$;
$R_{96}$ is hydrogen, $C_1$-$C_{20}$alkyl; $C_2$-$C_{20}$alkyl interrupted by one or more O; or is -L-M-$R_{98}$ or -L-$R_{98}$;
$R_{97}$ has one of the meanings as given for $R_{96}$ or is

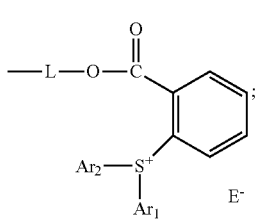

$R_{98}$ is a monovalent sensitizer or photoinitiator moiety;
$Ar_1$ and $Ar_2$ independently of one another are phenyl unsubstituted or substituted by $C_1$-$C_{20}$alkyl, halogen or $OR_{99}$;
or are unsubstituted naphthyl, anthryl, phenanthryl or biphenylyl;
or are naphthyl, anthryl, phenanthryl or biphenylyl substituted by $C_1$-$C_{20}$alkyl, OH or $OR_{99}$;
or are $-Ar_4$-$A_1$-$Ar_3$ or

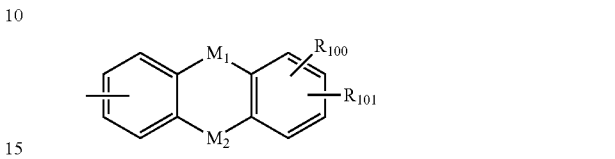

$Ar_3$ is unsubstituted phenyl, naphthyl, anthryl, phenanthryl or biphenylyl;
or is phenyl, naphthyl, anthryl, phenanthryl or biphenylyl substituted by $C_1$-$C_{20}$alkyl, $OR_{99}$ or benzoyl;
$Ar_4$ is phenylene, naphthylene, anthrylene or phenanthrylene;
$A_1$ is a direct bond, S, O or $C_1$-$C_{20}$alkylene;
X is CO, C(O)O, OC(O), O, S or $NR_{99}$;
L is a direct bond, S, O, $C_1$-$C_{20}$alkylene or $C_2$-$C_{20}$alkylene interrupted by one or more non-consecutive O;
$R_{99}$ is $C_1$-$C_{20}$alkyl or $C_1$-$C_{20}$hydroxyalkyl; or is $C_1$-$C_{20}$alkyl substituted by $O(CO)R_{102}$;
$M_1$ is S, CO or $NR_{100}$;
$M_2$ is a direct bond, $CH_2$, O or S;
$R_{100}$ and $R_{101}$ independently of one another are hydrogen, halogen, $C_1$-$C_8$alkyl, $C_1$-$C_8$alkoxy or phenyl;
$R_{102}$ is $C_1$-$C_{20}$alkyl;
$R_{103}$ is

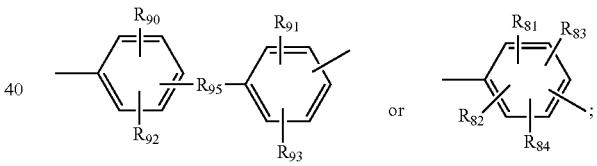

and
E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

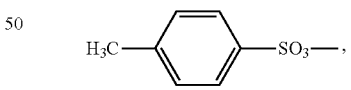

$CH_3$—$SO_3$, $ClO_4$, $PO_4$, $NO_3$, $SO_4$, $CH_3$—$SO_4$, or

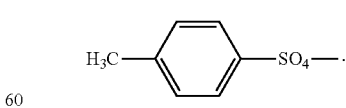

Specific examples of sulfonium salt compounds are for example Irgacure®270 (BASF SE); Cyracure® UVI-6990, Cyracure®UVI-6974 (Union Carbide), Degacure®KI 85 (Degussa), SP-55, SP-150, SP-170 (Asahi Denka), GE UVE 1014 (General Electric), SarCat®KI-85 (=triarylsulfonium hexafluorophosphate; Sartomer), SarCat® CD 1010

(=mixed triarylsulfonium hexafluoroantimonate; Sartomer); SarCat® CD 1011(=mixed triarylsulfonium hexafluorophosphate; Sartomer), Suitable iodonium salt compounds are of formula

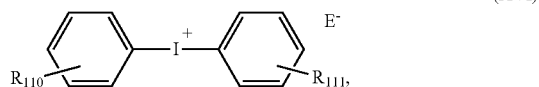

wherein
$R_{110}$ and $R_{111}$ are each independently of the other hydrogen, $C_1$-$C_{20}$alkyl, $C_1$-$C_{20}$alkoxy, OH-substituted $C_1$-$C_{20}$alkoxy, halogen, $C_2$-$C_{12}$alkenyl, $C_3$-$C_8$cycloalkyl, especially methyl, isopropyl or isobutyl; and
E is an anion, especially $PF_6$, $SbF_6$, $AsF_6$, $BF_4$, $(C_6F_5)_4B$, Cl, Br, $HSO_4$, $CF_3$—$SO_3$, F—$SO_3$,

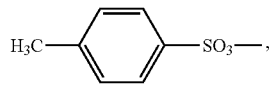

$CH_3$—$SO_3$, $ClO_4$, $PO_4$, $NO_3$, $SO_4$, $CH_3$—$SO_4$ or

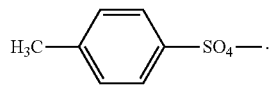

Specific examples of iodonium salt compounds are e.g. tolylcumyliodonium tetrakis(pentafluorophenyl)borate, 4-[(2-hydroxy-tetradecyloxy)phenyl]phenyliodonium hexafluoroantimonate or hexafluorophosphate, tolylcumyliodonium hexafluorophosphate, 4-isopropylphenyl-4'-methylphenyliodonium hexafluorophosphate, 4-isobutylphenyl-4'-methylphenyliodonium hexafluorophosphate (Irgacure®250, BASF SE), 4-octyloxyphenyl-phenyliodonium hexafluorophosphate or hexafluoroantimonate, bis(dodecylphenyl)iodonium hexafluoroantimonate or hexafluorophosphate, bis(4-methylphenyl)iodonium hexa-fluorophosphate, bis(4-methoxyphenyl)iodonium hexafluorophosphate, 4-methylphenyl-4'-ethoxyphenyliodonium hexafluorophosphate, 4-methylphenyl-4'-dodecylphenyliodonium hexafluorophosphate, 4-methylphenyl-4'-phenoxyphenyliodonium hexafluorophosphate.

Of all the iodonium salts mentioned, compounds with other anions are, of course, also suitable. The preparation of iodonium salts is known to the person skilled in the art and described in the literature, for example U.S. Pat. Nos. 4,151,175, 3,862,333, 4,694,029, EP 562897, U.S. Pat. Nos. 4,399,071, 6,306,555, WO 98/46647 J. V. Crivello, "Photoinitiated Cationic Polymerization" in: UV Curing: Science and Technology, Editor S. P. Pappas, pages 24-77, Technology Marketing Corporation, Norwalk, Conn. 1980, ISBN No. 0-686-23773-0; J. V. Crivello, J. H. W. Lam, Macromolecules, 10, 1307 (1977) and J. V. Crivello, Ann. Rev. Mater. Sci. 1983, 13, pages 173-190 and J. V. Crivello, Journal of Polymer Science, Part A: Polymer Chemistry, Vol. 37, 4241-4254 (1999).

Acylphosphinoxides, such as, for example, bis(2,4,6-trimethylbenzoyl)-phenylphosphine oxide, 2,4,6-trimethylbenzoyl-diphenyl-phosphine oxide and ethyl phenyl(2,4,6-trimethylbenzoyl)phosphinate, are preferred for curing with light sources having emission peak(s) in the UV-A range and (near) VIS range (Laser, LEDs, LCD). alpha-Hydroxy ketone type compounds, such as, for example, 1-hydroxy-cyclohexyl-phenyl-ketone, 2-hydroxy-2-methyl-1-phenyl-propan-1-one, 2-hydroxy-1-{4-[4-(2-hydroxy-2-methyl-propionyl)-benzyl]-phenyl}-2-methyl-propan-1-one, 1-[4-(2-hydroxyethoxy)-phenyl]-2-hydroxy-2-methyl-1-propan-1-one, Esacure KIP provided by Lamberti, 2-hydroxy-1-{1-[4-(2-hydroxy-2-methyl-propionyl)-phenyl]-1,3,3-trimethyl-indan-5-yl}-2-methyl-propan-1-one and mixtures thereof, are preferred for curing with UV laser having emission peak at 355 nm (SLA).

If the light source emitts radiation over a broad range, UV and visible range (e.g. mercury bilbs), or light sources of different wavelengths are combined (e.g. LEDs, laser), the absorption range of one photoinitiator might not cover the entire range. This can be achieved by combining two different photoinitiator types, e.g. alpha-hydroxy ketones (1-hydroxy-cyclohexyl-phenyl-ketone, 2-hydroxy-2-methyl-1-phenyl-propan-1-one, or 2-hydroxy-1-{4-[4-(2-hydroxy-2-methyl-propionyl)-benzyl]-phenyl}-2-methyl-propan-1-one) with acyl phosphinoxides (bis(2,4,6-trimethylbenzoyl)-phenylphosphine oxide, 2,4,6-trimethylbenzoyl-diphenyl-phosphine oxide and ethyl phenyl(2,4,6-trimethylbenzoyl)phosphinate. If visible radiation is used for curing specific photoinitiators like titanocenes, such as, for example, bis (cyclopentadienyl) bis[2,6-difluoro-3-(1-pyrryl)phenyl titanium (Omnirad 784) are required.

The photoinitiators are used typically in a proportion of from about 0.5 to 10% by weight, especially 0.1 to 5.0% by weight based on the total weight of composition.

Halogen is fluorine, chlorine, bromine and iodine.

$C_1$-$C_{24}$alkyl ($C_1$-$C_{20}$alkyl, especially $C_1$-$C_{12}$alkyl) is typically linear or branched, where possible. Examples are methyl, ethyl, n-propyl, isopropyl, n-butyl, sec.-butyl, isobutyl, tert.-butyl, n-pentyl, 2-pentyl, 3-pentyl, 2,2-dimethylpropyl, 1,1,3,3-tetramethylpentyl, n-hexyl, 1-methylhexyl, 1,1,3,3,5,5-hexamethylhexyl, n-heptyl, isoheptyl, 1,1,3,3-tetramethylbutyl, 1-methylheptyl, 3-methylheptyl, n-octyl, 1,1,3,3-tetramethylbutyl and 2-ethylhexyl, n-nonyl, decyl, undecyl, dodecyl, tridecyl, tetradecyl, pentadecyl, hexadecyl, heptadecyl, or octadecyl. $C_1$-$C_8$alkyl is typically methyl, ethyl, n-propyl, isopropyl, n-butyl, sec.-butyl, isobutyl, tert.-butyl, n-pentyl, 2-pentyl, 3-pentyl, 2,2-dimethyl-propyl, n-hexyl, n-heptyl, n-octyl, 1,1,3,3-tetramethylbutyl and 2-ethylhexyl. $C_1$-$C_4$alkyl is typically methyl, ethyl, n-propyl, isopropyl, n-butyl, sec.-butyl, isobutyl, tert.-butyl.

$C_2$-$C_{12}$alkenyl ($C_2$-$C_5$alkenyl) groups are straight-chain or branched alkenyl groups, such as e.g. vinyl, allyl, methallyl, isopropenyl, 2-butenyl, 3-butenyl, isobutenyl, n-penta-2,4-dienyl, 3-methyl-but-2-enyl, n-oct-2-enyl, or n-dodec-2-enyl.

$C_1$-$C_{12}$alkoxy groups ($C_1$-$C_8$alkoxy groups) are straight-chain or branched alkoxy groups, e.g. methoxy, ethoxy, n-propoxy, isopropoxy, n-butoxy, sec-butoxy, tert-butoxy, amyloxy, isoamyloxy or tert-amyloxy, heptyloxy, octyloxy, isooctyloxy, nonyloxy, decyloxy, undecyloxy and dodecyloxy.

$C_1$-$C_{12}$alkylthio groups ($C_1$-$C_8$ alkylthio groups) are straight-chain or branched alkylthio groups and have the same preferences as the akoxy groups, except that oxygen is exchanged against sulfur.

$C_1$-$C_{12}$alkylene is bivalent $C_1$-$C_{12}$alkyl, i.e. alkyl having two (instead of one) free valencies, e.g. trimethylene or tetramethylene.

A cycloalkyl group is typically $C_3$-$C_8$cycloalkyl, such as, for example, cyclopentyl, cyclohexyl, cycloheptyl, or cyclooctyl, which may be unsubstituted or substituted.

In several cases it is advantageous to in addition to the photoinitiator employ a sensitizer compound. Examples of suitable sensitizer compounds are disclosed in WO 06/008251, page 36, line 30 to page 38, line 8, the disclosure of which is hereby incorporated by reference. As sensitizer inter alia benzophenone compounds as described above can be employed.

If desired, the photocurable compositions may comprise further mixture constituents which are preferably selected from
at least one component D which is in turn selected from
(D.4) defoamers and deaerating agents;
(D.5) lubricants and leveling agents;
(D.6) thermally curing and/or radiation-curing auxiliaries;
(D.7) substrate wetting auxiliaries;
(D.8) wetting and dispersing auxiliaries;
(D.9) hydrophobizing agents;
(D.10) in-can stabilizers; and
(D.11) auxiliaries for improving scratch resistance;
at least one component E which is in turn selected from
(E.1) dyes; and
(E.2) pigments;
at least one component F which is in turn selected from light, heat and oxidation stabilizers; and
at least one component G which is in turn selected from IR-absorbing compounds.

The effect of the defoamers and deaerating agents (D.4), lubricants and leveling agents (D.5), thermally curing or radiation-curing auxiliaries (D.6), substrate wetting auxiliaries (D.7), wetting and dispersing auxiliaries (D.8), hydrophobizing agents (D.9), in-can stabilizers (D.10) and auxiliaries for improving scratch resistance (D.11) listed under component D usually cannot be strictly distinguished from one another. For instance, lubricants and leveling agents often additionally act as defoamers and/or deaerating agents and/or as auxiliaries for improving scratch resistance. Radiation-curing auxiliaries can in turn act as lubricants and leveling agents and/or deaerating agents and/or also as substrate wetting auxiliaries. In accordance with the above statements, a certain additive may therefore be attributed to more than one of the groups (D.4) to (D.11) described below.

The defoamers of group (D.4) include silicon-free and silicon-containing polymers. The silicon-containing polymers are, for example, unmodified or modified polydialkylsiloxanes or branched copolymers, comb copolymers or block copolymers composed of polydialkylsiloxane and polyether units, the latter being obtainable from ethylene oxide or propylene oxide.

The deaerating agents of group (D.4) include, for example, organic polymers, for instance polyethers and polyacrylates, dialkylpolysiloxanes, especially dimethylpolysiloxanes, organically modified polysiloxanes, for instance arylalkyl-modified polysiloxanes, or else fluorosilicones. The action of defoamers is based essentially on preventing foam formation or destroying foam which has already formed. Deaerating agents act essentially in such a way that they promote the coalescence of finely distributed gas or air bubbles to larger bubbles in the medium to be deaerated, for example the inventive compositions, and hence accelerate the escape of the gas (or of the air). Since defoamers can often also be used as deaerating agents and vice versa, these additives have been combined together under group (D.4). Such auxiliaries are, for example, obtainable commercially from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 960, Tego® Airex 970, Tego® Airex 980 and Tego® Airex 985, and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-067, BYK®-070, BYK®-080, BYK®-088, BYK®-141 and BYK®-A 530.

The auxiliaries of group (D.4) are typically used in a proportion of from about 0.05 to 3.0% by weight, preferably from about 0.5 to 2.0% by weight, based on the total weight of the composition.

The group (D.5) of the lubricants and leveling agents includes, for example, silicon-free but also silicon-containing polymers, for example polyacrylates or modified low molecular weight polydialkylsiloxanes. The modification consists in replacing some of the alkyl groups with a wide variety of organic radicals. These organic radicals are, for example, polyethers, polyesters or else long-chain alkyl radicals, the former finding most frequent use. The polyether radicals of the correspondingly modified polysiloxanes are typically formed by means of ethylene oxide and/or propylene oxide units. The higher the proportion of these alkylene oxide units is in the modified polysiloxane, the more hydrophilic is generally the resulting product.

Such auxiliaries are obtainable commercially, for example, from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (also usable as a defoamer and deaerating agent), TEGO® Flow ATF, TEGO® Flow ATF2, TEGO® Flow 300, TEGO® Flow 460, TEGO® Flow 425 and TEGO® Flow ZFS 460. The radiation-curable lubricants and leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000, likewise obtainable from Tego. Such auxiliaries are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

The auxiliaries of group (D.5) are typically used in a proportion of from about 0.005 to 1.0% by weight, preferably from about 0.01 to 0.2% by weight, based on the total weight of the composition.

Group (D.6) includes, as radiation-curing auxiliaries, in particular polysiloxanes with terminal double bonds which are, for example, part of an acrylate group. Such auxiliaries can be made to crosslink by actinic or, for example, electron beam radiation. These auxiliaries generally combine several properties in one. In the uncrosslinked state, they can act as defoamers, deaerating agents, lubricants and leveling agents and/or substrate wetting aids; in the crosslinked state, they increase in particular the scratch resistance, for example of articles which can be produced with the inventive compositions. The improvement in the shine performance, for example, articles can essentially be regarded as the effect of the action of these auxiliaries as defoamers, devolatilizers and/or lubricants and leveling agents (in the uncrosslinked state). The radiation-curing auxiliaries which can be used are, for example, the products TEGO® Rad 2100, TEGO® Rad 2200, TEGO® Rad 2500, TEGO® Rad 2600 and TEGO® Rad 2700 obtainable from Tego, and the product BYK®-371 obtainable from BYK. Thermally curing auxiliaries of group (D.6) comprise, for example, primary OH groups which can react with isocyanate groups.

The thermally curing auxiliaries used can, for example, be the products BYK®-370, BYK®-373 and BYK®-375 obtainable from BYK. The auxiliaries of group (D.6) are typically used in a proportion of from about 0.1 to 5.0% by weight, preferably from about 0.1 to 3.0% by weight, based on the total weight of the composition.

The auxiliaries of group (D.7) of the substrate wetting aids serve in particular to increase the wettability of the substrate, which is to be imprinted or coated, for instance, by printing inks or coating compositions, for example compositions (a.1) to (a.5). The generally associated improvement in the lubricating and leveling performance of such printing inks or coating compositions has an effect on the appearance of the finished (for example crosslinked) print or of the finished (for example crosslinked) layer. A wide variety of such auxiliaries are commercially available, for example, from Tego as TEGO® Wet KL 245, TEGO® Wet 250, TEGO® Wet 260 and TEGO® Wet ZFS 453, and from BYK as BYK®-306, BYK®-307, BYK®-310, BYK®-333, BYK®-344, BYK®-345, BYK®-346 and Byk®-348.

Also very suitable are the products of the Zonyl® brand from Dupont, such as Zonyl® FSA and Zonyl® FSG. These are fluorinated surfactants/wetting agents.

The auxiliaries of group (D.7) are typically used in a proportion of from about 0.01 to 3.0% by weight, preferably from about 0.01 to 1.5% by weight and especially from 0.03 to 1.5% by weight, based on the total weight of the composition.

The auxiliaries of group (D.8) of the wetting and dispersing aids serve in particular to prevent the leaching and floating and also the settling of pigments, and are therefore useful, if necessary, in pigmented compositions in particular.

These auxiliaries stabilize pigment dispersions essentially by electrostatic repulsion and/or steric hindrance of the additized pigment particles, the interaction of the auxiliary with the surrounding medium (for example binder) playing a major role in the latter case. Since the use of such wetting and dispersing aids is common practice, for example, in the technical field of printing inks and paints, the selection of such a suitable auxiliary in the given case generally presents no difficulties to the person skilled in the art.

Such wetting and dispersing aids are supplied commercially, for example, by Tego as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W, and by BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra® 5 206, BYK®-151, BYK®-154, BYK®-155, BYK®-P 104 S, BYK®-P 105, Lactimon®, Lactimon®-WS and Bykumen®. The abovementioned Zonyl® brands, such as Zonyl® FSA and Zonyl® FSG, from DuPont are also useful here.

The dosage of the auxiliaries of group (D.8) depends mainly upon the surface area of the pigments to be covered and upon the mean molar mass of the auxiliary.

For inorganic pigments and low molecular weight auxiliaries, a content of the latter of from about 0.5 to 2.0% by weight based on the total weight of pigment and auxiliary is typically assumed. In the case of high molecular weight auxiliaries, the content is increased to from about 1.0 to 30% by weight.

In the case of organic pigments and low molecular weight auxiliaries, the content of the latter is from about 1.0 to 5.0% by weight based on the total weight of pigment and auxiliary. In the case of high molecular weight auxiliaries, this content may be in the range from about 10.0 to 90% by weight. In every case, therefore, preliminary experiments are recommended, which can, though, be accomplished by the person skilled in the art in a simple manner.

The hydrophobizing agents of group (D.9) can be used with a view, for example, to providing articles obtained with inventive compositions with water-repellent properties. This means that swelling resulting from water absorption and hence a change, for example, in the optical properties of such articles is no longer possible or at least greatly suppressed. In addition, when the compositions are used, for example, as a printing ink in 3D printing, their absorption of water can be prevented or at least greatly inhibited. Such hydrophobizing agents are commercially available, for example, from Tego as Tego® Phobe WF, Tego® Phobe 1000, Tego® Phobe 1000 S, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The auxiliaries of group (D.9) are used typically in a proportion of from about 0.05 to 5.0% by weight, preferably from about 0.1 to 3.0% by weight, based on the total weight of the composition.

In-can stabilizers of group (D.10) provide increased storage stability from manufacturing to curing. Examples of in-can stabilizers of group (D.10) are:
Phosphites and phosphonites (processing stabilizer), for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane, phosphorous acid, mixed 2,4-bis(1,1-dimethylpropyl)phenyl and 4-(1,1-dimethylpropyl)phenyl triesters (CAS No. 939402-02-5), Phosphorous acid, triphenyl ester, polymer with alpha-hydro-omega-hydroxypoly[oxy(methyl-1,2-ethanediyl)], C10-16 alkyl esters (CAS No. 1227937-46-3). The following phosphites are especially preferred:

Tris(2,4-di-tert-butylphenyl) phosphite, tris(nonylphenyl) phosphite,

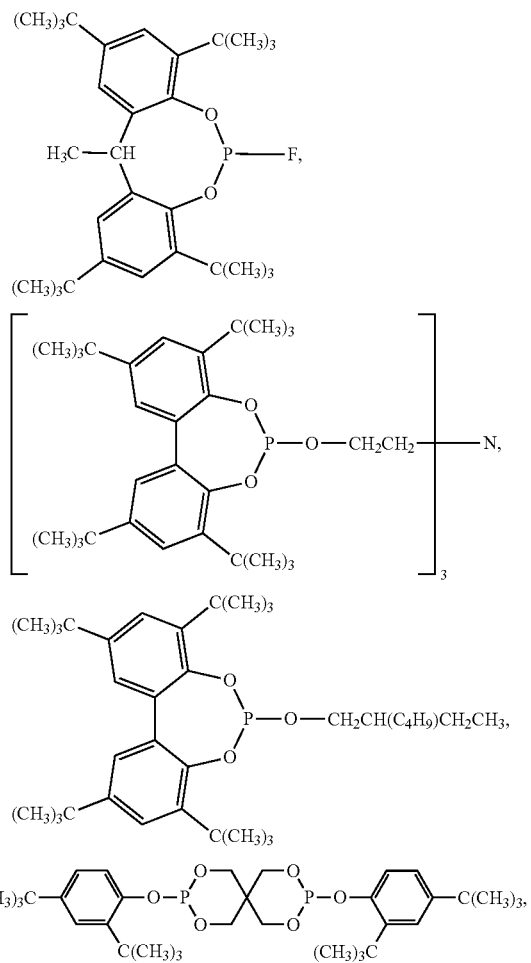

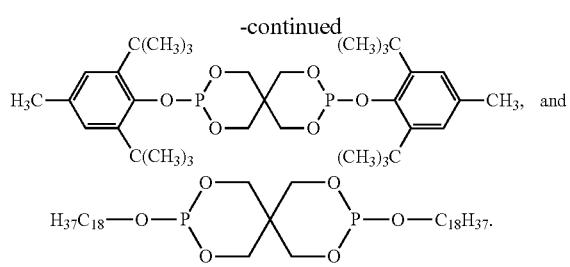

Quinone Methides of the Formula

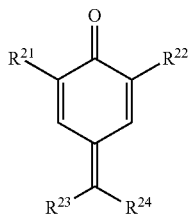

(providing long term shelf life stability), wherein
$R^{21}$ and $R^{22}$ independently of each other are $C_1$-$C_{18}$alkyl, $C_5$-$C_{12}$cycloalkyl, $C_7$-$C_{15}$-phenylalkyl, optionally substituted $C_6$-$C_{10}$aryl;
$R^{23}$ and $R^{24}$ independently of each other are H, optionally substituted $C_6$-$C_{10}$-aryl, 2-,3-,4-pyridyl, 2-,3-furyl or thienyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein R$^{25}$ and R$^{26}$ are independently of each other $C_1$-$C_8$alkyl, or phenyl. Quinone methides are preferred, wherein R$^{21}$ and R$^{22}$ are tert-butyl;
R$^{23}$ is H, and R$^{24}$ is optionally substituted phenyl, COOH, COOR$^{25}$, CONH$_2$, CONHR$^{25}$, CONR$^{25}$R$^{26}$, —CN, —COR$^{25}$, —OCOR$^{25}$, —OPO(OR$^{25}$)$_2$, wherein R$^{25}$ and R$^{26}$ are $C_1$-$C_8$alkyl, or phenyl. Examples of quinone methides are

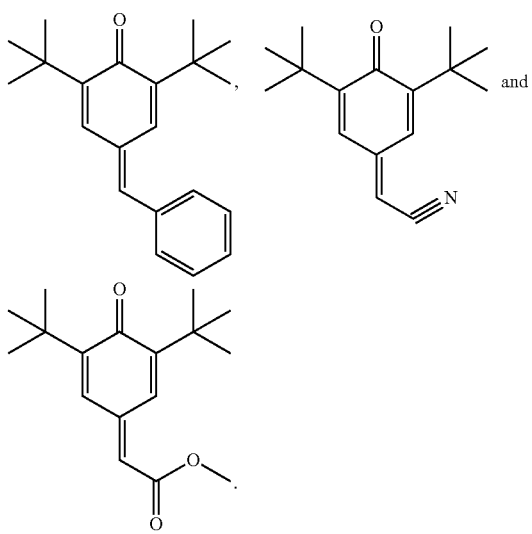

The quinone methides may be used in combination with highly sterically hindered nitroxyl radicals as described, for example, in US20110319535.

In-can stabilizers of group (D.10) are used typically in a proportion of from about 0.01 to 0.3% by weight, preferably from about 0.04 to 0.15% by weight, based on the total weight of the composition.

The group (D.11) of the auxiliaries for improving scratch resistance includes, for example, the products TEGO® Rad 2100, TEGO® Rad 2200, TEGO® Rad 2500, TEGO® Rad 2600 and TEGO® Rad 2700 which are obtainable from Tego and have already been mentioned above.

For these auxiliaries, useful amounts are likewise those mentioned in group (D.6), i.e. these additives are typically used in a proportion of from about 0.1 to 5.0% by weight, preferably from about 0.1 to 3.0% by weight, based on the total weight of the composition.

The group (E.1) of the dyes includes, for example, dyes from the class of the azo dyes, metal complex dyes, basic dyes such as di- and triarylmethane dyes and salts thereof, azomethine derivatives, polymethines, antraquinone dyes and the like. An overview of suitable dyes which can be used in the inventive composition is given by the book by H. Zollinger, "Color Chemistry", Wiley-VCH, Weinheim, 3rd edition 2003.

It is in particular also possible to add to the inventive compositions photochromic, thermochromic or luminescent dyes, and dyes which have a combination of these properties. In addition to the typical fluorescent dyes, fluorescent dyes should also be understood to mean optical brighteners. Optical brighteners may be used for the optimization of the absorption characteristics (critical energy and depth of penetration) of the photocurable composition.

Examples of the latter include the class of the bisstyrylbenzenes, especially of the cyanostyryl compounds, and correspond to the formula

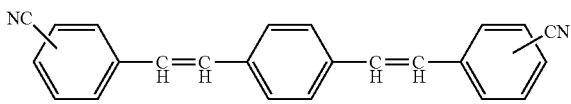

Further suitable optical brighteners from the class of the stilbenes are, for example, those of the formulae

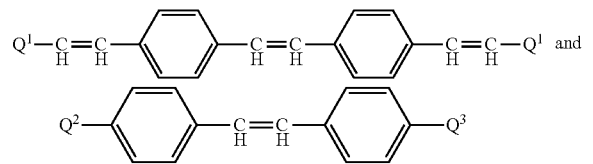

in which $Q^1$ is in each case $C_1$-$C_4$-alkoxycarbonyl or cyano, $Q^2$ is benzoxazol-2-yl, which may be mono- or disubstituted by $C_1$-$C_4$-alkyl, especially methyl, $Q^3$ is $C_1$-$C_4$-alkoxycarbonyl or 3-($C_1$-$C_4$-alkyl)-1,2,4-oxadiazol-3-yl.

Further suitable optical brighteners from the class of the benzoxazoles obey, for example, the formulae

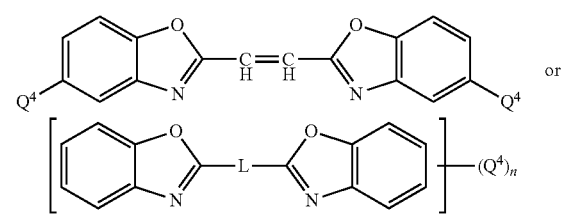

in which $Q^4$ is in each case $C_1$-$C_4$-alkyl, especially methyl, L is a radical of the formula

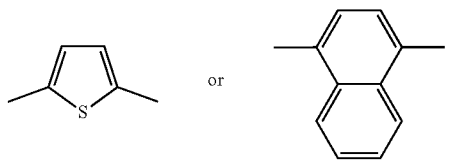

and n is an integer from 0 to 2.

Suitable optical brighteners from the class of the coumarins have, for example, the formula

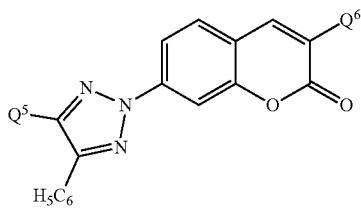

in which
$Q^5$ is $C_1$-$C_4$-alkyl and
$Q^6$ is phenyl or 3-halopyrazol-1-yl, especially 3-chloropyrazol-1-yl.

Further suitable optical brighteners from the class of the pyrenes correspond, for example, to the formula

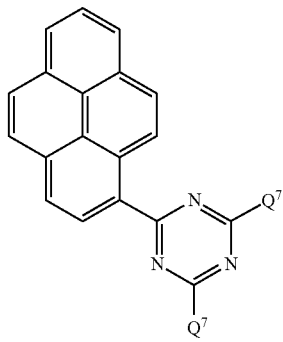

in which
$Q^7$ is in each case $C_1$-$C_4$-alkoxy, especially methoxy.

The abovementioned brighteners can be used either alone or in a mixture with one another.

The abovementioned optical brighteners are generally commercially available products known per se. They are described, for example, in Ullmann's Encyclopedia of Industrial Chemistry, 5th edition, volume A18, pages 156 to 161, or can be obtained by the methods described there.

In particular, if desired, one or more optical brighteners from the class of the bisstyrylbenzenes is used, especially of the cyanostyrylbenzenes. The latter may be used as individual compounds, but also as a mixture of the isomeric compounds.

In this case, the isomers correspond to the formulae

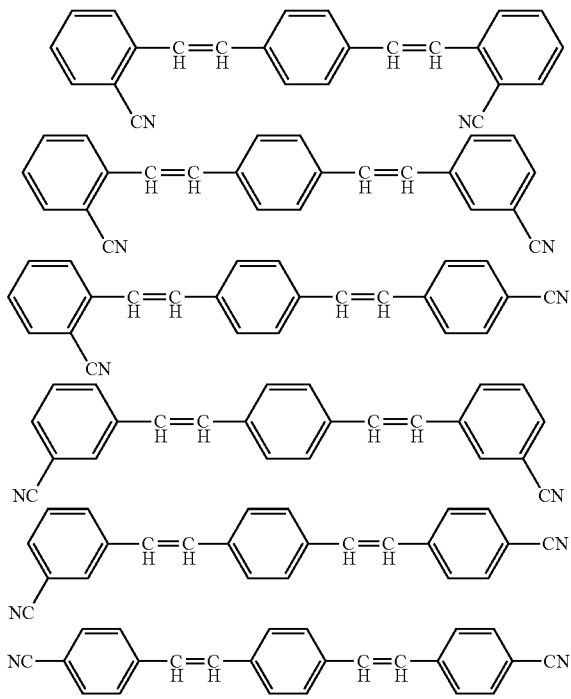

Optical brighteners are sold, for example, commercially as Ultraphor® SF 004, Ultraphor® SF MO, Ultraphor® SF MP and Ultraphor® SF PO from BASF SE.

The group (E.2) of the pigments includes both inorganic and organic pigments. An overview of inorganic colored pigments which can be used in the inventive compositions is given by the book by H. Endriß "Aktuelle anorganische Bunt-Pigmente" ["Current inorganic colored pigments"] (publisher U. Zorll, Curt-R.-Vincentz-Verlag Hanover 1997), and the book by G. Buxbaum, "Industrial Inorganic Pigments", Wiley-VCH, Weinheim, $3^{rd}$ edition 2005. In addition, useful further pigments which are not listed in the aforementioned book are also Pigment Black 6 and Pigment Black 7 (carbon black), Pigment Black 11 (iron oxide black, $Fe_3O_4$), Pigment White 4 (zinc oxide, ZnO), Pigment White 5 (lithopone, $ZnS/BaSO_4$), Pigment White 6 (titanium oxide, $TiO_2$) and Pigment White 7 (zinc sulfide, ZnS).

An overview of organic pigments which can be added to the inventive compositions is provided by the book by W. Herbst and K. Hunger "Industrielle organische Pigmente" ["Industrial Organic Pigments"], Wiley-VCH, Weinheim, 3rd edition 2004.

It is also possible to add to the inventive compositions magnetic, electrically conductive, photochromic, thermochromic or luminescent pigments, and also pigments which have a combination of these properties.

In addition to some organic pigments, for example Lumogen® Yellow 0795 (BASF SE), useful pigments having luminescent properties are also inorganic, doped or undoped compounds essentially based on alkaline earth metal oxides, alkaline earth metal/transition metal oxides, alkaline earth metal/aluminum oxides, alkaline earth metal/silicon oxides or alkaline earth metal/phosphorus oxides, alkaline earth metal halides, Zn/silicon oxides, Zn/alkaline earth metal halides, rare earth metal oxides, rare earth metal/transition metal oxides, rare earth metal/aluminum oxides, rare earth metal/silicon oxides or rare earth metal/phosphorus oxides, rare earth metal oxide sulfides or oxide halides, zinc oxide, sulfide or selenide, cadmium oxide, sulfide or selenide or zinc/cadmium oxide, sulfide or selenide, the cadmium compounds being of lower importance owing to their toxicological and ecological relevance.

The dopants used in these compounds are usually aluminum, tin, antimony, rare earth metals, such as cerium, europium or terbium, transition metals, such as manganese, copper, silver or zinc, or combinations of these elements.

Luminescent pigments are specified below by way of example, the notation "compound:element(s)" being taken to mean to the relevant person skilled in the art that said compound has been doped with the corresponding element(s). In addition, for example, the notation "(P,V)", denotes that the corresponding lattice positions in the solid structure of the pigment are randomly occupied by phosphorus and vanadium.

Examples of such compounds which are capable of luminescence are $MgWO_4$, $CaWO_4$, $Sr_4Al_{14}O_{25}$:Eu, $BaMg_2Al_{10}O_{27}$:Eu, $MgAl_{11}O_{19}$:Ce,Tb, $MgSiO_3$:Mn, $Ca_{10}(PO_4)_6(F,Cl)$:Sb,Mn, $(SrMg)_2P_2O_7$:Eu, $SrMg_2P_2O_7$:Sn, BaFCl:Eu, $Zn_2SiO_4$:Mn, $(Zn,Mg)F_2$:Mn, $Y_2O_3$:Eu, $YVO_4$:Eu, $Y(P,V)O_4$:Eu, $Y_2SiO_5$:Ce,Tb, $Y_2O_2S$:Eu, $Y_2O_2S$:Tb, $La_2O_2S$:Tb, $Gd_2O_2S$:Tb, LaOBr:Tb, ZnO:Zn, ZnS:Mn, ZnS:Ag, ZnS/CdS:Ag, ZnS:Cu,Al, ZnSe:Mn, ZnSe:Ag and ZnSe:Cu.

Examples of light, heat and/or oxidation stabilizers as component F include:

alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctylthiomethyl-6-methylphenol, 2,4-dioctylthiomethyl-6-ethylphenol and 2,6-didodecylthiomethyl-4-nonylphenol, hydroquinones and alkylated hydroquinones, such as 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl) disulfide, alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2-ethylidenebis(4,6-di-tert-butylphenol), 2,2'-ethylidenebis(6-tert-butyl-4-isobutylphenol), 2,2'-methylenebis[6-(α- methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide and isooctyl-3,5-di-tert-butyl-4-hydroxybenzylmercaptoacetate, aromatic hydroxybenzyl compounds, such as 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene and 2,4,6-tris(3,5-di-tert-butyl-4-hydroxybenzyl)phenol, triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl) hexahydro-1,3,5-triazine, 1,3,5-tris(3,5-dicyclohexyl-4-hydroxybenzyl) isocyanurate and 1,3,5-tris(2-hydroxyethyl) isocyanurate, benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzylphosphonate, acylaminophenols, such as 4-hydroxylauroylanilide, 4-hydroxystearoylanilide and octyl N-(3,5-di-tert-butyl-4-hydroxyphenyl)carbamate, propionic and acetic esters, for example of monohydric or polyhydric alcohols, such as methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane and 4-hydroxymethyl-1-phospha-2,6,7-trioxabicyclo[2.2.2]octane, propionamides based on amine derivatives, such as N,N'-bis(3,5-di-tert-butyl-4-hydroxyphenylpropionyl) hexamethylenediamine, N,N'-bis(3,5-di-tert-butyl-4-hydroxyphenylpropionyl)trimethylenediamine and N,N'-bis(3,5-di-tert-butyl-4-hydroxyphenylpropionyl)hydrazine, ascorbic acid (Vitamin C) and ascorbic acid derivatives, such as ascorbyl palmitate, laurate and stearate, and ascorbyl sulfate and phosphate, antioxidants based on amine compounds, such as N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl]amine, 2,6-di-tert-butyl-4-dimethylaminomethylphenol, 2,4-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl) sebacate, 2,2,6,6-tetramethylpiperidin-4-one and 2,2,6,6-tetramethylpiperidin-4-ol, phosphites and phosphonites, such as triphenylphosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2.6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylenediphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite, 2-(2'-hydroxyphenyl)benzotriazoles, such as 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis- (α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl], sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamate, dioctadecyl disulfide and pentaerythritol tetrakis(β-dodecylmercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl-3,5-di-tert-butyl-4-hydroxybenzoate, octadecyl-3,5-di-tert-butyl-4-hydroxybenzoate and 2-methyl-4,6-di-tert-butylphenyl-3,5-di-tert-butyl-4-hydroxybenzoate, acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl-α-cyano-β-methyl-p-methoxycinnamate and methyl-α-methoxycarbonyl-p-methoxycinnamate, sterically hindered amines, such as bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidin-4-yl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,5-tetramethylpiperidin-4-yl)hexamethylenediamine and 4-tert-octylamino-2,6-dichloro-1,3,5-triazine, tris(2,2,6,6-tetramethylpiperidin-4-yl) nitrilotriacetate, tetrakis(2,2,6,6-tetramethylpiperidin-4-yl) 1,2,3,4-butanetetracarboxylate, 1,1'-(1,2-ethylene)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl) 2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidin-4-yl) sebacate, bis(1-octyloxy-2,2,6,5-tetramethylpiperidin-4-yl) succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino)ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethylpiperidin-4-yl)pyrrolidine-2,5-dione, 3-dodecyl-1-(1,2,2,6,6-pentamethylpiperidin-4-yl)pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl) hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecylsuccinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]decane, the condensation product of 7,7,9,9-tetramethyl-2-cycloundecyl-1-oxa-3,8-diaza-4-oxospiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]siloxane, oxamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methyl-5 phenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy) phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine and 2-(2-hydroxyphenyl)-4-(4-methoxyphenyl)-6-phenyl-1,3,5-triazine.

The components G of the IR absorber used are compounds which exhibit one or more absorption bands in the infrared spectral region, i.e. from >750 nm, e.g. from 751 nm, to 1 mm. Preference is given to compounds which exhibit one absorption band in the near infrared (NIR) spectral region, i.e. from >750 (e.g. 751) to 2000 nm, and optionally additionally also in the visible spectral region, especially from 550 to 750 nm. When the compounds absorb both in the IR and in the visible spectral region, they preferably exhibit the greatest absorption maximum in the IR region and a smaller maximum (frequently in the form of a so-called absorption shoulder) in the visible region. In a particular embodiment, the compounds of component G additionally also exhibit fluorescence. Fluorescence is the transition of a system excited by absorption of electromagnetic radiation (usually visible light, UV radiation, X-rays or electron beams) to a state of lower energy by spontaneous emission of radiation of the same wavelength (resonance fluorescence) or longer wavelength. Preferred compounds of component G exhibit, when they fluoresce, a fluorescence in the IR spectral region, preferably in the NIR.

Such compounds are, for example, selected from naphthalenes, anthracenes, phenanthrenes, tetracenes, perylenes, terrylenes, quaterrylenes, pentarylenes, hexarylenes, anthraquinones, indanthrones, acridines, carbazoles, dibenzofuranes, dinaphthofuranes, benzimidazoles, benzthiazoles, phenazines, di,oxazines, quinacridones, metal phthalocyanines, metal naphthalocyanines, metal porphyrines, coumarines, dibenzofuranones, dinaphthofuranones, benzimidazolones, indigo compounds, thioindigo compounds, quinophthalones, naphthoquinophthalones and diketopyrrolopyrroles. Particularly preferred compounds of component G which absorb IR radiation and optionally fluoresce are selected from naphthalenes, anthracenes, phenanthrenes, tetracenes, perylenes, terrylenes, quaterrylenes, pentarylenes and hexarylenes, more preferably from perylenes, terrylenes and quaterrylenes and especially from terrylenes and quaterrylenes. The compound is especially a quaterrylene. Suitable compounds are described in WO 2008/012292, which is hereby fully incorporated by reference.

The present disclosure(s) also provides methods suitable for making 3-dimensional structures comprising a plurality of polymer layers and 3-dimensional patterns.

Some embodiments provide methods of patterning a polymeric image on a substrate, each method comprising;
(a) depositing a layer of photocurable composition of any one of the compositions described herein on the substrate;
(b) irradiating a portion of the layer of photocurable composition with a light having appropriate wavelength(s), thereby providing a patterned layer of polymerized and unpolymerized regions. Certain other embodiments further comprise removing the unpolymerized region of the pattern.

The method may comprise depositing a plurality of layers of a photocurable composition on a substrate before irradiation, at least one of which is the photocurable composition of the present invention.

The irradiated portion is patterned through use of a photomask, by a direct writing application of light, by interference, nanoimprint, or diffraction gradient lithography, by inkjet 3D printing, stereolithography, holography, LCD or digital light projection (DLP).

The photocurable compositions may be irradiated by any variety of methods known in the art. Patterning may be achieved by photolithography, using a positive or negative image photomask, by interference lithography (i.e., using a diffraction grating), by proximity field nanopatterning by diffraction gradient lithography, or by a direct laser writing application of light, such as by multi-photon lithography, by nanoimprint lithography, by inkjet 3D printing, stereolithography and the digital micromirror array variation of stereolithography (commonly referred to as digital light projection (DLP). The photocurable compositions are especially amenable to preparing structures using stereolithographic methods, for example including digital light projection (DLP). The photocurable compositions may be processed as bulk structures, for example using vat polymerization, wherein the photopolymer is cured directly onto a translated or rotated substrate, and the irradiation is patterned via stereolithography, holography, or digital light projection (DLP).

Stereolithography (SLA) is a form of three-dimensional (3D) printing technology used for creating models, prototypes, patterns and production parts in a layer by layer fashion (so-called "additive manufacturing") using photopolymerization, a process by which light causes chains of molecules to link, forming polymers. Those polymers then make up the body of a three-dimensional solid. Typically, an SLA additive manufacturing process uses a build platform having a build tray submerged in a liquid photosensitive material. A 3D model of the item to be manufactured is imported into an associated 3D printer software, which software slices the 3D model into 2D images that are then projected onto the build platform to expose the photopolymer.

FIG. 3 of U.S. Pat. No. 4,575,330 depicts a known prior art "top-down" approach to printing. A container 21 is filled with a UV curable liquid 22 or the like, to provide a designated working surface 23. A programmable source of ultraviolet (UV) light 26 produces a spot of ultraviolet light 27 in the plane of surface 23. The spot 27 is movable across the surface 23 by the motion of mirrors or other optical or mechanical elements that are a part of light source 26. The position of the spot 27 on surface 23 is controlled by a computer 28. A movable elevator platform 29 inside container 21 is moved up and down selectively, the position of the platform being controlled by the computer 28. The elevator platform may be driven mechanically, pneumatically, hydraulically or electrically, and it typically uses optical or electronic feedback to precisely control its position. As the device operates, it produces a three-dimensional object 30 by step-wise buildup of integrated laminate such as 30a, 30b, 30c. During this operation, the surface of the UV curable liquid 22 is maintained at a constant level in the container 21, and the spot of UV light 27 is moved across the working surface 23 in a programmed manner. As the liquid 22 cures and solid material forms, the elevator platform 29 that was initially just below surface 23 is moved down from the surface in a programmed manner by any suitable actuator. In this way, the solid material that was initially formed is taken below surface 23 and new liquid 22 flows across the surface 23. A portion of this new liquid is, in turn, converted to solid material by the programmed UV light spot 27, and the new material adhesively connects to the material below it. This process is continued until the entire three-dimensional object 30 is formed.

A computer controlled pump (not shown) may be used to maintain a constant level of the liquid 22 at the working surface 23. Appropriate level detection system and feedback networks can be used to drive a fluid pump or a liquid displacement device to offset changes in fluid volume and maintain constant fluid level at the surface 23. Alternatively, the source 26 can be moved relative to the sensed level 23 and automatically maintain sharp focus at the working surface 23. All of these alternatives can be readily achieved by conventional software operating in conjunction with the computer control system 28.

An alternative approach is to build the item from the "bottom-up" as depicted in FIG. 4 of U.S. Pat. No. 4,575,330. In this approach, the UV curable liquid 22 floats on a heavier UV transparent liquid 32 that is non-miscible and non-wetting with the curable liquid 22. By way of example, ethylene glycol or heavy water are suitable for the intermediate liquid layer 32. In the system of FIG. 4, the three-dimensional object 30 is pulled up from the liquid 22, rather than down and further into the liquid medium, as shown in the system of FIG. 3. In particular, the UV light source 26 in FIG. 4 focuses the spot 27 at the interface between the liquid 22 and the non-miscible intermediate liquid layer 32, the UV radiation passing through a suitable UV transparent window 33, of quartz or the like, supported at the bottom of the container 21.

According WO2018106977, and in lieu of printing just from resin in its liquid phase, one or more layers of the item are printed from resin that is foamed (at the build surface 23).

FIG. 3 of WO2018106977 depicts a representative implementation of an additive manufacturing method and apparatus wherein resin foam is the source material for the printer. A top-down printing method is depicted. In this example embodiment, the SLA apparatus comprises a radiation source 300 (e.g., DLP, laser, electron beam (EB), x-ray, etc. and scanner), a movement control mechanism 302 (e.g., a stepper motor) that moves a build platform 304 vertically up and down within a tank 305 that holds the photopolymer resin 306, and a sweeper 308 (also known as a "recoater" blade) that sweeps horizontally. These elements are used to print a part 310 in the manner previously described. The SLA apparatus is augmented with a foam producing and dispensing mechanism to facilitate production of resin foam at the printer interface, namely, the layer being printed. To this end, the mechanism comprises a foaming or pressure vessel 312, an electromechanical valve 314, and a hose or tube 316. A manifold 318 is attached to the sweeper 308 to evenly distribute the foamed resin across the top layer of the build surface. In particular, and as depicted, the foaming vessel receives liquid resin and a suitable gas (e.g., $CO_2$, $N_2O$, etc.). Gas is dissolved in the liquid resin within the foaming vessel (e.g., by shaking, missing, agitation, etc.) and selectively delivered to the build plate/platform via the hose 316 when the valve 314 is actuated, e.g., by a solenoid or other electromechanical, pneumatic, optical or electronic control device. Typically, the mechanism is under program control using a computer, which may be the same computer used to control the printer. In this embodiment, the mechanism includes a frother 320 (e.g., a mechanical agitator, an ultrasonic device, etc.) to shake or otherwise dissolve the gas within the liquid vessel if needed to produce foam.

Upon delivery of the resin and gas mixture (directly onto the build plate via the manifold 318), the gas spontaneously evolves out of the liquid mixture (due to the lower pressure) to produce a foam that is radiation-curable. The sweeper 308 spreads the foam evenly onto the plate, and the light engine is then activated to display the appropriate image to cure (solidify) the foam into a layer. Once the layer is formed, the movement control mechanism moves the platform down so that the next layer of the item can be built; the process is then repeated, once again preferably using the foam layer at the print interface.

While the preferred technique uses layer-wise additive manufacturing, other manufacturing processes may be used to process the foam to produce the build item, such as, for example, laser holography, wherein two lasers intersect in a tank of foamed resin and cure the resin at that spot.

The photocurable composition of the present invention is preferably used in vat photopolymerization (stereolithography) and photopolymerjetting/printing.

In addition, the present invention is directed to a method for producing a three-dimensional article, comprising
 a) providing the photocurable composition of the present invention,
 b) exposing the photocurable composition to actinic radiation to form a cured crossection,
 c) repeating steps (a) and (b) to build up a three-dimensional article.

In a preferred embodiment the method comprises a vat photopolymerization, wherein the photocurable of the present invention in step b) is cured directly onto a translated or rotated substrate, and the irradiation is patterned via stereolithography, holography, or digital light projection (DLP).

In another preferred embodiment the method comprises
 a) applying a layer of the photocurable composition of the present invention onto a surface;
 b) exposing the layer imagewise to actinic radiation to form an imaged cured cross-section;
 c) applying a second layer of the photocurable composition onto the previously exposed imaged cross-section;
 d) exposing the layer from step (c) imagewise to actinic radiation to form an additional imaged cross-section, wherein the radiation causes curing of the second layer in the exposed areas and adhesion to the previously exposed cross-section; and
 e) repeating steps (c) and (d) in order to build up a three-dimensional article.

Accordingly, the present invention is also directed to a three-dimensional article produced by the method of the present invention, or a three-dimensional article, which is a cured product of the photocurable composition of the present invention.

The three-dimensional article may have an Izod impact strength (unnotched) of greater than 45 $kJ/m^2$, especially of greater than 50 kJ/m2, very especially of greater than 55 $kJ/m^2$. The three-dimensional article may have an E modulus of greater than 1750 MPa, especially of greater than 1950 MPa, very especially of greater than 1950 MPa. The mechanical properties of the cured compositions (three-dimensional article) can be modified by changing the ratio of 5-methyl-3-vinyl-oxazolidin-2-one and the used oligomers to obtain materials with good mechanical performance, either focusing on high impact strength (Examples 1 to 3) or high E modulus (Example 4).

The photocurable compositions of the present invention may be used in dual cure stereolithography resins suitable for stereolithography techniques (particularly for CLIP). Reference is made to U.S. Pat. No. 9,453,142, US2016/0136889, US2016/0137838 and US2016/016077. These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object. The photocurable compositions of the present invention may be comprised by Part A.

The following examples illustrate the invention without restricting it.

EXAMPLES

Viscosity:

The viscosity of the photocurable compositions was determined at 30° C. in accordance with DIN EN ISO 3219 using a cone/plate HR-1 Discovery Hybrid Rheometer (TA Instruments) and a cone of 60 mm diameter and an angle of 2° at a shear rate of 100 $s^{-1}$.

Preparation of Specimen for Tensile (DIN ISO 527-1, Specimen Type 5A) and Impact Strength Tests (DIN ISO 180)

All specimen were prepared by casting using home-made silicone molds. After filling of the molds the photopolymers were pre-cured (pinning) in a light cabinet equipped with UVA fluorescent tubes (Sylvania blacklight 368, F40W, T12) for 60 seconds at 5.9 $mW/cm^2$ irradiance (Gigahertz- Optik X1, sensor UV-3717-4), measured with UV-Control 3CT (UV-technik meyer GmbH). UV curing was performed on both sides of the specimen under a 365 nm UV-LED (Hoenle) in 5 passes (tensile specimen, 2 mm thickness) and 10 passes at 500 mJ/cm².

| Component | Example1 Wt-% | Example 2 Wt-% | Example 3 Wt-% | Example 4 Wt-% |
|---|---|---|---|---|
| 5-methyl-3-vinyl-oxazolidin-2-one | 69.50 | 49.50 | 39.50 | 39.50 |
| Laromer ® UA 9089[1) | 29.50 | 49.50 | 59.50 | — |
| Visiomer ® HEMATMDI[2) | — | — | — | 59.50 |
| Omnirad ® TPO-L[3) | 1.00 | 1.00 | 1.00 | 1.00 |
| Total | 100.00 | 100.00 | 100.00 | 100.00 |
| Viscosity [mPas] at 30° C./100 s$^{-1}$ | 27 | 113 | 259 | 74 |
| E modulus [MPa] | 2000 ± 32 | 1450 ± 31 | 1140 ± 32 | 2730 ± 59 |
| Tensile strength at break [MPa] | 47.0 ± 1.2 | 42.3 ± 2.6 | 50.8 ± 6.9 | 84.8 ± 3.3 |
| Elongation at break [%] | 29.8 ± 9.2 | 49.9 ± 12.6 | 79.8 ± 13.2 | 7.8 ± 4.3 |
| Izod impact strength (unnotched) [kJ/m²] | 49.6 ± 7.7 | 57.9 ± 9.9 | 60.1 ± 13.5 | 34.1 ± 12.6 |

[1)BASF,
[2)Evonik,
[3)IGM Resins.

As shown in the above Table the mechanical properties of the cured compositions can be modified by changing the ratio of 5-methyl-3-vinyl-oxazolidin-2-one and the used oligomers to obtain materials with good mechanical performance, either focusing on high impact strength (Examples 1 to 3) or high E modulus (Example 4). In addition, the viscosity of the composition in Example 1 is very low which makes it suitable for photopolymer jetting. Low viscous resins are also desired for vat-based printing processes to ensure an efficient recoating step.

The invention claimed is:

1. A method for producing a three-dimensional article, comprising
    a) providing the photocurable composition,
    b) exposing the photocurable composition to actinic radiation to form a cured crossection,
    c) repeating steps (a) and (b) to build up a three-dimensional article;
wherein the photocurable composition, comprises
    (A1) a N-vinyloxazolidinone of formula

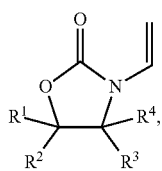

(I)

wherein
    $R^1$, $R^2$, $R^3$ and $R^4$ are independently of each other a hydrogen atom or an organic group having not more than 10 carbon atoms,
    (A2) optionally one, or more second reactive diluents,
    (B) one, or more oligomers, and
    (C) a photoinitiator (C), wherein the amount of component (A1) is 5 to 70% by weight based on the amount of components (A1), (A2) and (B).

2. The method according to claim 1, wherein the amount of components (A1) and (A2) is 30 to 70% by weight, and the amount of component (B) is 70 to 30% by weight, based on the amount of components (A1), (A2) and (B).

3. The method according to claim 1, wherein and least two of $R^1$ to $R^4$ n formula I are a hydrogen atom.

4. The method according to claim 1, wherein the N-vinyloxazolidinone of formula I is selected from a compound, wherein $R^1$, $R^2$, $R^3$ and $R^4$ are a hydrogen atom, a compound, wherein $R^1$ is a $C_1$-$C_4$alkyl group, and $R^2$, $R^3$ and $R^4$ are a hydrogen atom, and a compound, wherein $^1$ and $R^2$ are a hydrogen atom and $R^3$ and $R^4$ are a $C_1$-$C_4$alkyl group, and mixtures thereof.

5. The method according to claim 1, wherein the oligomer (B) is selected from the group consisting of polyester acrylates, polyether acrylates, epoxy acrylates and urethane acrylates.

6. The method according to claim 1, wherein the oligomer (B) is obtained by reacting
    (B1) a hydroxyalkylacrylate, or hydroxyalkylmethacrylate,
    (B2) an aliphatic diisocyanate, an aliphatic polyisocyanate, a cycloaliphatic diisocyanate, a cycloaliphatic polyisocyanate, an aromatic diisocyanate, or an aromatic polyisocyanate, or mixtures thereof,
    (B3) a polyester polyol, which is derived from aliphatic dicarboxylic acids and aliphatic diols, and
    (B4) optionally a secondary polyol.

7. The method according to claim 6, wherein component (B1) is selected from the group consisting of 2-hydroxyethyl acrylate, 2-hydroxyethyl methacrylate, 2- or 3-hydroxypropyl acrylate, 2- or 3-hydroxypropyl methacrylate, 4-hydroxybutyl methacrylate, and 4-hydroxybutyl acrylate, component (B2) is selected from the group consisting of 4,4'-, 2,4'- and/or 2,2'-methylenedicyclohexyl diisocyanate (H12MDI), isophorone diisocyanate (IPDI) and tolylene 2,4- and/or 2,6-diisocyanate (TDI) and the polyester polyol (B3) is derived from adipic acid and ethylene glycol and 1,4-butanediol ((poly(ethylene 1,4-butylene adipate) diol, PEBA).

8. The method according to claim 5, wherein the oligomer (B) is obtained by reacting a polyalkylene glycol with a lactone of formula

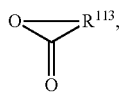

(B)

at least one cycloaliphatic or asymmetric aliphatic diisocyanate and an hydroxyalkyl(meth)acrylate, or by reacting a lactone of formula (B) with at least one cycloaliphatic or asymmetric aliphatic diisocyanate and an hydroxyalkyl (meth)acrylate, wherein $R^{113}$ is a divalent alkylene radical having 1 to 12 carbon atoms and which is optionally be substituted by $C_1$-$C_4$alkyl groups and/or interrupted by one or more oxygen atoms.

9. The method according to claim 8, wherein the oligomer (B) is obtained by reacting c-caprolactone, 4,4'-, 2,4'- and/or 2,2'-methylenedicyclohexyl diisocyanate and hydroxyethylacrylate.

10. The method according to claim 5, wherein the oligomer (B) is obtained by reacting aliphatic, aromatic, or cyclic diisocyanates with hydroxyalkyl(meth)acrylate.

11. The method according to claim 1, wherein the photoinitiator (C) is selected from acylphosphine oxide compounds, benzophenone compounds, alpha-aminoketone compounds, phenylglyoxylate compounds, oxime ester compounds, mixtures thereof and mixtures with alpha-hydroxy ketone compounds, or alpha-alkoxyketone compounds.

12. The method according to claim 1, wherein the photoinitiator (C) is a compound of the formula

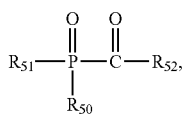

(XII)

wherein
$R_{50}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$alkoxy, $C_1$-$C_{12}$alkylthio or by $NR_{53}R_{54}$; or $R_{50}$ is unsubstituted $C_1$-$C_{20}$alkyl or is $C_1$-$C_{20}$alkyl which is substituted by one or more halogen, $C_1$-$C_{12}$-alkoxy, $C_1$-$C_{12}$alkylthio, $NR_{53}R_{54}$ or by —(CO)—O—$C_1$-$C_{24}$alkyl;

$R_{51}$ is unsubstituted cyclohexyl, cyclopentyl, phenyl, naphthyl or biphenylyl; or is cyclohexyl, cyclopentyl, phenyl, naphthyl or biphenylyl substituted by one or more halogen, $C_1$-$C_{12}$alkyl, $C_1$-$C_{12}$-alkoxy, $C_1$-$C_{12}$alkylthio or by $NR_{53}R_{54}$; or $R_{51}$ is —(CO)$R'_{52}$; or $R_{51}$ is $C_1$-$C_{12}$-alkyl which is unsubstituted or substituted by one or more halogen, $C_1$-$C_{12}$-alkoxy, $C_1$-$C_{12}$alkylthio, or by $NR_{53}R_{54}$;

$R_{52}$ and $R'_{52}$ independently of each other are unsubstituted cyclohexyl, cyclopentyl, phenyl, naphthyl or biphenylyl, or are cyclohexyl, cyclopentyl, phenyl, naphthyl or biphenylyl substituted by one or more halogen, $C_1$-$C_4$alkyl or $C_1$-$C_4$alkoxy; or $R_{52}$ is a 5- or 6-membered heterocyclic ring comprising an S atom or N atom;

$R_{53}$ and $R_{54}$ independently of one another are hydrogen, unsubstituted $C_1$-$C_{12}$alkyl or $C_1$-$C_{12}$alkyl substituted by one or more OH or SH wherein the alkyl chain optionally is interrupted by one to four oxygen atoms; or $R_{53}$ and $R_{54}$ independently of one another are $C_2$-$C_{12}$-alkenyl, cyclopentyl, cyclohexyl, benzyl or phenyl, or the photoinitiator (C) is a mixture of a compound of the formula (XII) and a compound of the formula

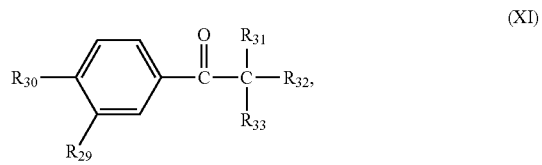

(XI)

wherein
$R_{29}$ is hydrogen or $C_1$-$C_{18}$ alkoxy;
$R_{30}$ is hydrogen, $C_1$-$C_{18}$ alkyl, $C_1$-$C_{12}$ hydroxyalkyl, $C_1$-$C_{18}$ alkoxy, $OCH_2CH_2$—$OR_{34}$, morpholino, S—$C_1$-$C_{18}$ alkyl, a group —HC=$CH_2$, —$C(CH_3)$=$CH_2$,

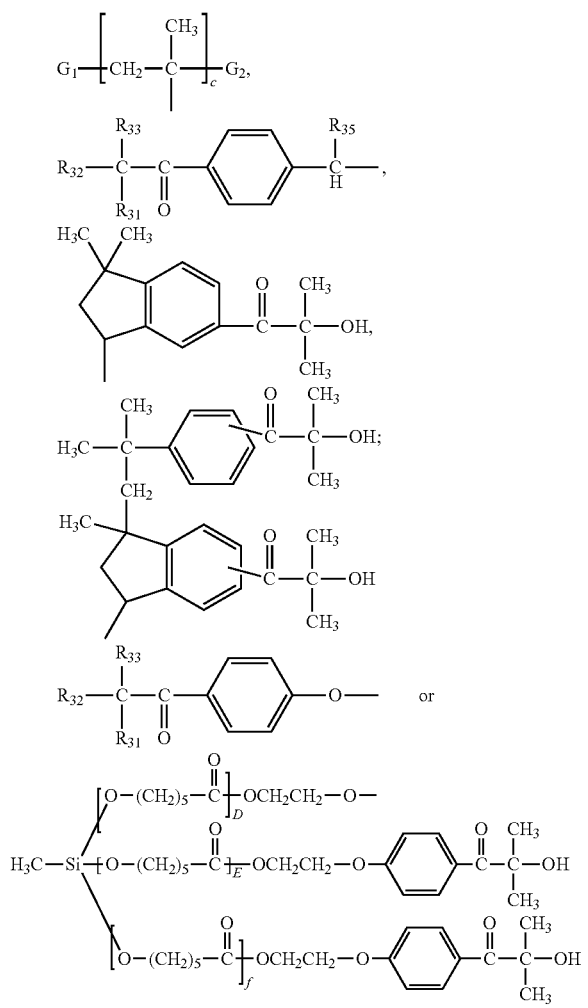

D, E and f are 1-3;
c is 2-10;
$G_1$ and $G_2$ independently of one another are end groups of the polymeric structure;

$R_{34}$ is hydrogen,

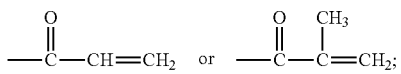

$R_{31}$ is hydroxy, $C_1$-$C_{16}$alkoxy, morpholino, dimethylamino or —O(CH$_2$CH$_2$O)$_g$-$C_1$-$C_{16}$alkyl;
g is 1-20;
$R_{32}$ and $R_{33}$ independently of one another are hydrogen, $C_1$-$C_6$alkyl, $C_1$-$C_{16}$alkoxy or —O(CH$_2$CH$_2$O)$_g$-$C_1$-$C_{16}$alkyl; or are unsubstituted phenyl or benzyl; or phenyl or benzyl substituted by $C_1$-$C_{12}$-alkyl; or $R_{32}$ and $R_{33}$ together with the carbon atom to which they are attached form a cyclohexyl ring;
$R_{35}$ is hydrogen, OR$_{36}$ or NR$_{37}$R$_{38}$;
$R_{36}$ is hydrogen, $C_1$-$C_{12}$alkyl which optionally is interrupted by one or more non-consecutive O-atoms and which uninterrupted or interrupted $C_1$-$C_{12}$alkyl optionally is substituted by one or more OH, or $R_{36}$ is

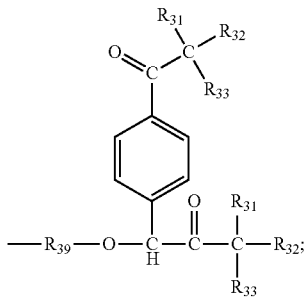

$R_{37}$ and $R_{38}$ independently of each other are hydrogen or $C_1$-$C_{12}$alkyl which is unsubstituted or is substituted by one or more OH;
$R_{39}$ is $C_1$-$C_{12}$alkylene which optionally is interrupted by one or more non-consecutive —O—(CO)—NH—$C_1$-$C_{12}$alkylene—NH—(CO)— or

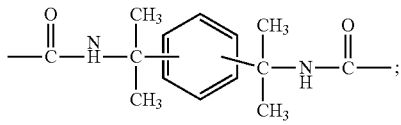

with the proviso that $R_{31}$, $R_{32}$ and $R_{33}$ not all together are $C_1$-$C_{16}$alkoxy or —O(CH$_2$CH$_{20}$)$_g$-$C_1$-$C_{16}$alkyl, or the photoinitiator is a mixture of different compounds of the formula (XII), or the photoinitiator is a mixture of compounds of the formula (XII) and (XI).

13. The method according to claim 1, comprising a vat photopolymerization, wherein the photocurable composition according to claim 1 in step b) is cured directly onto a translated or rotated substrate, and the irradiation is patterned via stereolithography, holography, or digital light projection (DLP).

14. The method according to claim 1, comprising
a) applying a layer of the photocurable composition onto a surface;
b) exposing the layer imagewise to actinic radiation to form an imaged cured cross-section;
c) applying a second layer of the photocurable composition onto the previously exposed imaged cross-section;
d) exposing the layer from step (c) imagewise to actinic radiation to form an additional imaged cross-section, wherein the radiation causes curing of the second layer in the exposed areas and adhesion to the previously exposed cross-section; and
e) repeating steps (c) and (d) in order to build up a three-dimensional article.

15. A three-dimensional article produced by the method according to claim 1.

16. The three-dimensional article according to claim 15 having an Izod impact strength (unnotched) of greater than 45 kJ/m$^2$ and/or an E modulus of greater than 1750 MPa.

17. The method according to claim 1, wherein the viscosity of said photocurable composition is in the range 10 to 1500 mPa·s at 30 °C.

18. The method according to claim 1, wherein the amount of components (A1) and (A2) in the photocurable composition is 50 to 70% by weight, and the amount of component (B) in the photocurable composition is 50 to 30% by weight based on the amount of components (A1), (A2) and (B).

19. The method according to claim 1, wherein the viscosity of the photocurable composition is in the range of 10 to 3000 mPa·s.

* * * * *